(12) United States Patent
Guan et al.

(10) Patent No.: US 11,356,205 B2
(45) Date of Patent: Jun. 7, 2022

(54) METHOD AND APPARATUS FOR RETRANSMITTING DATA

(71) Applicant: HUAWEI TECHNOLOGIES CO., LTD., Guangdong (CN)

(72) Inventors: Lei Guan, Beijing (CN); Sha Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/371,131

(22) Filed: Apr. 1, 2019

(65) Prior Publication Data
US 2019/0288797 A1    Sep. 19, 2019

Related U.S. Application Data

(63) Continuation of application No. PCT/CN2017/105045, filed on Sep. 30, 2017.

(30) Foreign Application Priority Data

Sep. 30, 2016    (CN) .......................... 201610879125.5

(51) Int. Cl.
*H04L 1/08*        (2006.01)
*H04L 1/16*        (2006.01)
(Continued)

(52) U.S. Cl.
CPC .................. *H04L 1/08* (2013.01); *H04L 1/00* (2013.01); *H04L 1/1671* (2013.01);
(Continued)

(58) Field of Classification Search
CPC ... H04L 1/1816; H04L 1/1819; H04L 1/1812; H04L 1/1896; H04L 1/0013; H04L 1/00;
(Continued)

(56) References Cited

U.S. PATENT DOCUMENTS 8,848,643 B2    9/2014  Chung et al.
9,084,248 B2    7/2015  Kim et al.
(Continued)

FOREIGN PATENT DOCUMENTS

CN    102447538 A    5/2012
CN    102714565 A    10/2012
(Continued)

OTHER PUBLICATIONS

You et al., U.S. Appl. No. 62/373,986, filed Aug. 12, 2016. (Year: 2016).*

(Continued)

*Primary Examiner* — Ian N Moore
*Assistant Examiner* — Sun Jong Kim
(74) *Attorney, Agent, or Firm* — Slater Matsil, LLP

(57) ABSTRACT

Method for receiving retransmitted data is disclosed. A terminal device receives identification information of a code block group. The code block group is one of a plurality of code block groups of a transport block that the terminal device received from a radio access network device, and the code block group includes at least one code block that is not transmitted correctly. The terminal device also receives a retransmission of the code block group from the radio access network device. The terminal device restores information carried in the received transport block. The identification information of the code block group is carried in downlink control information. The identification information of the code block group indicates which code block group of the transport block is retransmitted. The downlink control information further includes indication information that indicates whether the code block group is punctured or interfered.

20 Claims, 9 Drawing Sheets

(51) Int. Cl.
*H04L 1/18* (2006.01)
*H04W 72/12* (2009.01)
*H04L 1/00* (2006.01)

(52) U.S. Cl.
CPC .......... *H04L 1/1812* (2013.01); *H04L 1/1835* (2013.01); *H04L 1/1887* (2013.01); *H04L 1/1896* (2013.01); *H04W 72/12* (2013.01)

(58) Field of Classification Search
CPC ........... H04W 72/1278; H04W 72/042; H04W 72/12
See application file for complete search history.

(56) References Cited

U.S. PATENT DOCUMENTS

| | | | |
|---|---|---|---|
| 2010/0135221 A1* | 6/2010 | Komura | H04L 1/1887 370/329 |
| 2012/0005550 A1* | 1/2012 | Ito | H04L 1/0009 714/748 |
| 2012/0014347 A1* | 1/2012 | Tanaka | H04L 1/0007 370/329 |
| 2014/0153449 A1 | 6/2014 | Seo et al. | |
| 2014/0233395 A1* | 8/2014 | Goldsmith | H04L 1/16 370/242 |
| 2015/0358952 A1* | 12/2015 | Feng | H04W 72/044 370/329 |
| 2016/0173232 A1* | 6/2016 | Mallik | H04L 1/0009 714/800 |
| 2016/0373767 A1* | 12/2016 | Yang | H04N 19/129 |
| 2018/0070341 A1 | 3/2018 | Islam et al. | |
| 2018/0234155 A1* | 8/2018 | Neuhaus | H04B 7/0632 |
| 2019/0165882 A1* | 5/2019 | You | H04W 72/0453 |

FOREIGN PATENT DOCUMENTS

| | | |
|---|---|---|
| CN | 103378936 A | 10/2013 |
| CN | 103684660 A | 3/2014 |
| CN | 105979597 A | 9/2016 |
| CN | 109644451 A | 4/2019 |
| JP | 2010147755 A | 7/2010 |
| JP | 2012028875 A | 2/2012 |
| KR | 20090030562 A | 3/2009 |
| RU | 2547696 C2 | 4/2015 |
| WO | 2010109521 A1 | 9/2010 |
| WO | 2016019243 A1 | 2/2016 |
| WO | 2016100363 A1 | 6/2016 |
| WO | 2018004320 A1 | 1/2018 |
| WO | 2018041251 A1 | 3/2018 |

OTHER PUBLICATIONS

Nokia, Alcatel-Lucent Shanghai Bell,"Punctured Scheduling for Low Latency Transmissions",3GPP TSG-RAN WG1 #86 R1-167308,Gothenburg, Sweden, Aug. 22-26, 2016,total 4 pages.
Nokia, Alcatel-Lucent Shanghai Bell,"Punctured Scheduling for Low Latency Transmissions",3GPP TSG-RAN WG1 #85 R1-165381,Nanjing, P.R. China, May 23-27, 2016,total 4 pages.
Panasonic,"V2V synchronization remaining issues",3GPP TSG RAN WG1 Meeting #85 R1-165308,Nanjing, China May 23-27, 2016,total 4 pages.
ZTE et al., "Multiplexing of eMBB and URLLC",3GPP TSG RAN WG1 Meeting #86 R1-166408,Gothenburg, Sweden, Aug. 22-26, 2016,total 10 pages. XP051140214.
Complete English translations of Certified copy of priority document U.S. Appl. No. 62/373,986, filed Aug. 12, 2016, total 37 pages.
Complete English translations of Certified copy of priority document U.S. Appl. No. 62/357,385, filed Jul. 1, 2016, total 35 pages.

* cited by examiner

METHOD AND APPARATUS FOR RETRANSMITTING DATA

CROSS-REFERENCE TO RELATED APPLICATIONS

This application is a continuation of International Application No. PCT/CN2017/105045, filed on Sep. 30, 2017, which claims priority to Chinese Patent Application No. 201610879125.5, filed on Sep. 30, 2016. The disclosures of the aforementioned applications are hereby incorporated by reference in their entireties.

TECHNICAL FIELD

The present application relates to the field of mobile communications, and in particular, to a data transmission method and apparatus.

BACKGROUND

Service data transmission in Long Term Evolution (LTE) systems is scheduled by a base station, and a subframe is a basic time unit for scheduling. Generally speaking, duration of a subframe is 1 millisecond (ms), a subframe includes two slots, and a slot includes seven time domain symbols. A time domain symbol is an orthogonal frequency-division multiplexing (OFDM) or a single carrier frequency division multiple access (SC-FDMA) symbol in a time domain. A specific scheduling procedure includes: a base station transmits a control channel (such as a Physical Downlink Control Channel (PDCCH)); and a user equipment device (UE) detects the control channel in a subframe, and receives a downlink data channel or transmits an uplink data channel based on scheduling information carried on the detected control channel. The control channel may carry scheduling information of a downlink data channel (such as a Physical Downlink Shared Channel (PDSCH)) or an uplink data channel (such as a Physical Uplink Shared Channel (PUSCH)). The scheduling information includes control information such as resource allocation information, modulation and coding scheme, and hybrid automatic repeat request (HARM).

LTE systems use HARQ mechanism. In a downlink for example, after receiving a transport block (TB) carried on the PDSCH, a UE feeds back an acknowledgement (ACK) on an uplink if the TB is correctly received, or feeds back a negative acknowledgement (NACK) on the uplink if the TB is not correctly received. For frequency division duplexing (FDD), after receiving the PDSCH in a subframe n−4, the UE feeds back an ACK or a NACK in a subframe n (n represents sequence number). For time division duplexing (TDD), a time sequence relationship between PDSCH reception and corresponding ACK or NACK feedback is determined by a TDD uplink-downlink configuration. If a base station receives a NACK fed back by a UE, the base station subsequently retransmits, to the UE, the TB carried in previous PDSCH transmission. Further, the UE can perform HARQ combining on received information of the TB on the PDSCH received in retransmission and received information of the TB that is not correctly received previously, to enhance reception performance.

Fifth generation (5G) communication systems will further support massive Machine Type Communications (mMTC) and Ultra Reliable Low Latency Communications (URLLC) in addition to an enhanced mobile broadband (eMBB) over mobile broadband (MBB) of the fourth generation (4G) systems in technical features. For the URLLC, there are two basic requirements. One is a low latency required in time-sensitive services. For example, a current requirement for both the uplink and downlink user plane latencies is 0.5 ms. The other is an ultra high reliability. For example, a packet error rate of 10^(−5) within 1 ms is required. To support flexible resource reuse by eMBB and URLLC, a solution is that a burst of URLLC emergency service may punch an in-transmission eMBB service. Punching means that when the URLLC service is mapped to time-frequency resources, a part of resources, on which a downlink data channel of the in-transmission eMBB service is allocated, are overtaken. This meets the low-latency requirement of the URLLC service, but causes a performance loss of initial transmission or retransmission of the eMBB service. This means that, there is a high probability that a TB of the eMBB service that is currently transmitted is not correctly received by the UE.

LTE-Advanced systems or new radio (NR) systems of the 5G systems can use the HARQ mechanism. In a downlink for example, after UE receives a TB carried on a downlink data channel, the UE feeds back an ACK on an uplink if the TB is correctly received, or feeds back a NACK on an uplink if the TB is not correctly received. Currently, TB is a unit in data scheduling and the HARQ. Specifically, even if only one code block (CB) in a TB is not correctly received, the entire TB will not pass a TB cyclic redundancy check (CRC). This means that, the UE still considers that the entire TB is not correctly received, and further feeds back a NACK to the base station. After receiving the NACK, the base station considers that the entire TB is not correctly received by the UE, although actually most CBs are correctly received, and further, the base station performs retransmission scheduling on the entire TB for the UE subsequently. Even if the entire TB is retransmitted, the UE cannot correctly receive the TB by performing HARQ combining. The UE cannot learn which CB is punched by URLLC service in previous transmission. Therefore, when the UE feeds back the NACK, a HARQ buffer of the UE may store a URLLC service data instead of a CB of the UE. Therefore, when HARQ combining is performed with the retransmitted CB, a HARQ combining gain cannot be obtained. On the contrary, the CB cannot be correctly received again. Finally, there is a high probability that retransmission at an RLC layer is triggered, and system efficiency is reduced greatly.

Therefore, for a scenario in which the transmitted eMBB service is punched by the burst URLLC emergency service, or an extended scenario in which short-duration burst interference occurs in an eMBB transmission process, a more efficient data transmission processing method needs to be provided.

SUMMARY

This specification describes a data transmission method and apparatus to provide a more efficient data transmission processing method in a scenario of short-duration burst interference.

According to one aspect, an embodiment of the present application provides a terminal device that includes a receiving unit and a processing unit.

The receiving unit is configured to receive control information and indication information of an affected code block transmitted by a radio access network device. The control information is used by the radio access network device to schedule at least one transport block of the terminal device. Each of the at least one transport block includes at least one code block, and the affected code block is at least one code block in the at least one transport block.

The processing unit is configured to determine the affected code block based on the indication information of the affected code block.

The receiving unit is further configured to receive the at least one transport block based on the control information and the determined affected code block.

In a possible design, the indication information of the affected code block includes identifier information of the affected code block or identifier information of a resource corresponding to the affected code block.

In a possible design, the identifier information of the affected code block includes one of: an index of the affected code block; a group index of the affected code block; an index of a first code block, where the affected code block includes a code block before or after the first code block in sequence, or the affected code block includes the first code block and a code block before or after the first code block in sequence; an index of a first code block group, where the affected code block includes a code block before or after the first code block group in sequence, or the affected code block includes the first code block group and a code block before or after the first code block group in sequence.

In a possible design, the identifier information of the resource corresponding to the affected code block includes one of: an index of the resource corresponding to the affected code block; a group index of the resource corresponding to the affected code block; an index of a resource corresponding to a first code block, where the affected code block includes a code block before or after the first code block in sequence, or the affected code block includes the first code block and a code block before or after the first code block in sequence; an index of a resource group corresponding to a first code block, where the affected code block includes a code block before or after the first code block group in sequence, or the affected code block includes the first code block group and a code block before or after the first code block group in sequence.

In a possible design, if the at least one transport block is a transport block in HARQ retransmission, the control information carries the indication information of the affected code block; or if the at least one transport block is a transport block in initial HARQ transmission, the control information does not carry the indication information of the affected code block.

In a possible design, the at least one transport block is the transport block in HARQ retransmission, and the indication information of the affected code block is carried in a modulation and coding indication field in the control information.

In a possible design, if the at least one transport block is the transport block in HARQ retransmission, the receiving unit is configured to receive the at least one transport block, and skip performing HARQ combining on data corresponding to the affected code block.

In a possible design, the terminal device further includes: a transmission unit, configured to transmit first indication information to the radio access network device, where the first indication information indicates whether a second code block is correctly received, the second code block is a code block other than the affected code block in the at least one code block, and a quantity of bits included in the first indication information is less than a quantity of second code blocks.

Optionally, the indication information of the affected code block further includes information about whether the affected code block is included.

Optionally, the quantity of bits in the first indication information is 1.

Optionally, the transmission unit is further configured to transmit second indication information to the radio access network device, where the second indication information is used to indicate whether the affected code block is correctly received.

Optionally, a quantity of bits in the second indication information is 1.

Optionally, the terminal device does not transmit, to the radio access network device, indication information about whether the affected code block is correctly received.

According to another aspect, an embodiment of the present application provides a radio access network device. The radio access network device includes a transmission unit. The transmission unit is configured to transmit control information and indication information of an affected code block to a terminal device, where the control information is used by the radio access network device to schedule at least one transport block of the terminal device, each of the at least one transport block includes at least one code block, and the affected code block is at least one code block in the at least one transport block. The transmission unit is further configured to transmit at least one code block other than the affected code block in the at least one transport block to the terminal device.

In a possible design, the indication information of the affected code block includes identifier information of the affected code block or identifier information of a resource corresponding to the affected code block.

In a possible design, the identifier information of the affected code block includes:

an index of the affected code block; or a group index of the affected code block; or an index of a first code block, where the affected code block includes a code block before or after the first code block in sequence, or the affected code block includes the first code block and a code block before or after the first code block in sequence; or an index of a first code block group, where the affected code block includes a code block before or after the first code block group in sequence, or the affected code block includes the first code block group and a code block before or after the first code block group in sequence.

In a possible design, the identifier information of the resource corresponding to the affected code block includes:

an index of the resource corresponding to the affected code block; or a group index of the resource corresponding to the affected code block; or an index of a resource corresponding to a first code block, where the affected code block includes a code block before or after the first code block in sequence, or the affected code block includes the first code block and a code block before or after the first code block in sequence; or an index of a resource group corresponding to a first code block, where the affected code block includes a code block before or after the first code block group in sequence, or the affected code block includes the first code block group and a code block before or after the first code block group in sequence.

In a possible design, if the at least one transport block is a transport block in HARQ retransmission, the control information carries the indication information of the affected code block; or if the at least one transport block is a transport block in initial HARQ transmission, the control information does not carry the indication information of the affected code block.

In a possible design, the at least one transport block is the transport block in HARQ retransmission, and the indication information of the affected code block is carried in a modulation and coding indication field in the control information.

In a possible design, the radio access network device further includes: a receiving unit, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

According to another aspect, an embodiment of the present application provides a data transmission method, including:

receiving, by a terminal device, control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block;

determining, by the terminal device, the affected code block based on the indication information of the affected code block; and receiving, by the terminal device, the at least one transport block based on the control information and the determined affected code block.

In a possible design, the indication information of the affected code block includes identifier information of the affected code block or identifier information of a resource corresponding to the affected code block.

In a possible design, the identifier information of the affected code block includes:

an index of the affected code block; or a group index of the affected code block; or an index of a first code block, where the affected code block includes a code block before or after the first code block in sequence, or the affected code block includes the first code block and a code block before or after the first code block in sequence; or an index of a first code block group, where the affected code block includes a code block before or after the first code block group in sequence, or the affected code block includes the first code block group and a code block before or after the first code block group in sequence.

In a possible design, the identifier information of the resource corresponding to the affected code block includes:

an index of the resource corresponding to the affected code block; or a group index of the resource corresponding to the affected code block; or an index of a resource corresponding to a first code block, where the affected code block includes a code block before or after the first code block in sequence, or the affected code block includes the first code block and a code block before or after the first code block in sequence; or an index of a resource group corresponding to a first code block, where the affected code block includes a code block before or after the first code block group in sequence, or the affected code block includes the first code block group and a code block before or after the first code block group in sequence.

In a possible design, if the at least one transport block is a transport block in HARQ retransmission, the control information carries the indication information of the affected code block; or if the at least one transport block is a transport block in initial HARQ transmission, the control information does not carry the indication information of the affected code block.

In a possible design, the at least one transport block is the transport block in HARQ retransmission, and the indication information of the affected code block is carried in a modulation and coding indication field in the control information.

In a possible design, the receiving, by the terminal device, the at least one transport block based on the control information and the determined affected code block includes:

if the at least one transport block is the transport block in HARQ retransmission, skipping, by the terminal device, performing HARQ combining on data corresponding to the affected code block.

In a possible design, the method further includes: transmitting, by the terminal device, first indication information to the radio access network device, where the first indication information indicates whether a second code block is correctly received, the second code block is a code block other than the affected code block in the at least one code block, and a quantity of bits included in the first indication information is less than a quantity of second code blocks.

Optionally, the indication information of the affected code block further includes information about whether the affected code block is included.

Optionally, the quantity of bits in the first indication information is 1, and the transmitting, by the terminal device, first indication information to the radio access network device includes: if all the second code blocks are correctly received, transmitting, by the terminal device, an acknowledgement bit to the radio access network device; or if at least one second code block is not correctly received, transmitting, by the terminal device, a negative acknowledgement bit to the radio access network device.

Optionally, the method further includes: transmitting, by the terminal device, second indication information to the radio access network device, where the second indication information is used to indicate whether the affected code block is correctly received.

Optionally, a quantity of bits in the second indication information is 1, and the transmitting, by the terminal device, second indication information to the radio access network device includes: if all the affected code blocks are correctly received, transmitting, by the terminal device, an acknowledgement bit to the radio access network device; or if at least one affected code block is not correctly received, transmitting, by the terminal device, a negative acknowledgement bit to the radio access network device.

Optionally, the terminal device does not transmit, to the radio access network device, indication information about whether the affected code block is correctly received.

According to another aspect, an embodiment of the present application provides a data transmission method, including:

transmitting, by a radio access network device, control information and indication information of an affected code block to a terminal device, where the control information is used by the radio access network device to schedule at least one transport block of the terminal device, each of the at least one transport block includes at least one code block, and the affected code block is at least one code block in the at least one transport block; and transmitting, by the radio access network device, at least one code block other than the affected code block in the at least one transport block to the terminal device.

In a possible design, the indication information of the affected code block includes identifier information of the affected code block or identifier information of a resource corresponding to the affected code block.

In a possible design, the identifier information of the affected code block includes:

an index of the affected code block; or a group index of the affected code block; or an index of a first code block, where the affected code block includes a code block before or after the first code block in sequence, or the affected code block includes the first code block and a code block before or after the first code block in sequence; or an index of a first code block group, where the affected code block includes a code block before or after the first code block group in sequence, or the affected code block includes the first code block group and a code block before or after the first code block group in sequence.

In a possible design, the identifier information of the resource corresponding to the affected code block includes:

an index of the resource corresponding to the affected code block; or a group index of the resource corresponding to the affected code block; or an index of a resource corresponding to a first code block, where the affected code block includes a code block before or after the first code block in sequence, or the affected code block includes the first code block and a code block before or after the first code block in sequence; or an index of a resource group corresponding to a first code block, where the affected code block includes a code block before or after the first code block group in sequence, or the affected code block includes the first code block group and a code block before or after the first code block group in sequence.

In a possible design, if the at least one transport block is a transport block in HARQ retransmission, the control information carries the indication information of the affected code block; or if the at least one transport block is a transport block in initial HARQ transmission, the control information does not carry the indication information of the affected code block.

In a possible design, the at least one transport block is the transport block in HARQ retransmission, and the indication information of the affected code block is carried in a modulation and coding indication field in the control information.

In a possible design, the method further includes: receiving, by the radio access network device, first indication information transmitted by the terminal device, where the first indication information indicates whether a second code block is correctly received, the second code block is a code block other than the affected code block in the at least one code block, and a quantity of bits included in the first indication information is less than a quantity of second code blocks.

According to still another aspect, an embodiment of the present application provides a terminal device, including:

a receiving unit, configured to: receive control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block; and receive the at least one transport block based on the control information;

a processing unit, configured to determine, by the terminal device, the affected code block based on the indication information of the affected code block, and determine first indication information, where the first indication information indicates whether a second code block is correctly received, the second code block is a code block other than the affected code block in the at least one code block, and a quantity of bits included in the first indication information is less than a quantity of second code blocks; and a transmission unit, configured to transmit the first indication information to the radio access network device.

In a possible design, the quantity of bits in the first indication information is 1; and the processing unit is configured to determine whether all the second code blocks are correctly received, where if all the second code blocks are correctly received, the first indication information is an acknowledgement bit, or if at least one second code block is not correctly received, the first indication information is a negative acknowledgement bit.

In a possible design, the processing unit is further configured to determine second indication information, where the second indication information is used to indicate whether the affected code block is correctly received; and the transmission unit is further configured to transmit the second indication information to the radio access network device.

In a possible design, a quantity of bits in the second indication information is 1; and the processing unit is configured to determine whether all the affected code blocks are correctly received, where if all the affected code blocks are correctly received, the second indication information is an acknowledgement bit, or if at least one affected code block is not correctly received, the second indication information is a negative acknowledgement bit.

In a possible design, the terminal device does not transmit, to the radio access network device, indication information about whether the affected code block is correctly received.

In a possible design, the indication information of the affected code block includes identifier information of the affected code block or identifier information of a resource corresponding to the affected code block.

According to still another aspect, an embodiment of the present application provides a radio access network device, including:

a transmission unit, configured to: transmit control information and indication information of an affected code block to a terminal device, where the control information is used by the radio access network device to schedule at least one transport block of the terminal device, each of the at least one transport block includes at least one code block, and the affected code block is at least one code block in the at least one transport block; and transmit at least one code block other than the affected code block in the at least one transport block to the terminal device; and a receiving unit, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

In a possible design, the quantity of bits in the first indication information is 1.

In a possible design, the receiving unit is further configured to receive second indication information transmitted by the terminal device, where the second indication information indicates whether the affected code block is correctly received, and a quantity of bits included in the second indication information is less than a quantity of affected code blocks.

In a possible design, the quantity of bits in the second indication information is 1.

In a possible design, the radio access network device does not receive second indication information, where the second indication information is used to indicate whether the affected code block is correctly received.

In a possible design, the indication information of the affected code block includes identifier information of the affected code block or identifier information of a resource corresponding to the affected code block.

According to still another aspect, an embodiment of the present application provides a data transmission method, including:

receiving, by a terminal device, control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block;

receiving, by the terminal device, the at least one transport block based on the control information;

determining, by the terminal device, the affected code block based on the indication information of the affected code block; and transmitting, by the terminal device, first indication information to the radio access network device, where the first indication information indicates whether a second code block is correctly received, the second code block is a code block other than the affected code block in the at least one code block, and a quantity of bits included in the first indication information is less than a quantity of second code blocks.

In a possible design, the quantity of bits in the first indication information is 1; and the transmitting, by the terminal device, first indication information to the radio access network device includes: if all the second code blocks are correctly received, transmitting, by the terminal device, an acknowledgement bit to the radio access network device; or if at least one second code block is not correctly received, transmitting, by the terminal device, a negative acknowledgement bit to the radio access network device.

In a possible design, the method further includes: transmitting, by the terminal device, second indication information to the radio access network device, where the second indication information is used to indicate whether the affected code block is correctly received.

In a possible design, a quantity of bits in the second indication information is 1; and the transmitting, by the terminal device, second indication information to the radio access network device includes: if all the affected code blocks are correctly received, transmitting, by the terminal device, an acknowledgement bit to the radio access network device; or if at least one affected code block is not correctly received, transmitting, by the terminal device, a negative acknowledgement bit to the radio access network device.

In a possible design, the terminal device does not transmit, to the radio access network device, indication information about whether the affected code block is correctly received.

In a possible design, the indication information of the affected code block includes identifier information of the affected code block or identifier information of a resource corresponding to the affected code block.

Optionally, the identifier information of the affected code block includes:
an index of the affected code block; or
a group index of the affected code block; or
an index of a first code block, where the affected code block includes a code block before or after the first code block in sequence, or the affected code block includes the first code block and a code block before or after the first code block in sequence; or
an index of a first code block group, where the affected code block includes a code block before or after the first code block group in sequence, or the affected code block includes the first code block group and a code block before or after the first code block group in sequence.

Optionally, the identifier information of the resource corresponding to the affected code block includes:
an index of the resource corresponding to the affected code block; or
a group index of the resource corresponding to the affected code block; or
an index of a resource corresponding to a first code block, where the affected code block includes a code block before or after the first code block in sequence, or the affected code block includes the first code block and a code block before or after the first code block in sequence; or
an index of a resource group corresponding to a first code block, where the affected code block includes a code block before or after the first code block group in sequence, or the affected code block includes the first code block group and a code block before or after the first code block group in sequence.

Optionally, if the at least one transport block is a transport block in HARQ retransmission, the control information carries the indication information of the affected code block; or if the at least one transport block is a transport block in initial HARQ transmission, the control information does not carry the indication information of the affected code block.

Optionally, the at least one transport block is the transport block in HARQ retransmission, and the indication information of the affected code block is carried in a modulation and coding indication field in the control information.

Optionally, the receiving, by the terminal device, the at least one transport block based on the control information and the determined affected code block includes: if the at least one transport block is the transport block in HARQ retransmission, skipping, by the terminal device, performing HARQ combining on data corresponding to the affected code block.

Optionally, the method further includes:
receiving, by the terminal device, a code block that is not correctly received in the second code block and is transmitted by the radio access network device; or
receiving, by the terminal device, the affected code block and a code block that is not correctly received in the second code block, transmitted by the radio access network device.

According to another aspect, an embodiment of the present application provides a data transmission method, including:

transmitting, by a radio access network device, control information and indication information of an affected code block to a terminal device, where the control information is used by the radio access network device to schedule at least one transport block of the terminal device, each of the at least one transport block includes at least one code block, and the affected code block is at least one code block in the at least one transport block;

transmitting, by the radio access network device, at least one code block other than the affected code block in the at least one transport block to the terminal device; and receiving, by the radio access network device, first indication information transmitted by the terminal device, where the first indication information indicates whether a second code block is correctly received, the second code block is a code block other than the affected code block in the at least one code block, and a quantity of bits included in the first indication information is less than a quantity of second code blocks.

In a possible design, the quantity of bits in the first indication information is 1.

In a possible design, the method further includes: receiving, by the radio access network device, second indication information transmitted by the terminal device, where the second indication information indicates whether the affected code block is correctly received, and a quantity of bits included in the second indication information is less than a quantity of affected code blocks.

In a possible design, the quantity of bits in the second indication information is 1.

In a possible design, the method further includes: the radio access network device does not receive second indication information, where the second indication information is used to indicate whether the affected code block is correctly received.

In a possible design, the indication information of the affected code block includes identifier information of the affected code block or identifier information of a resource corresponding to the affected code block.

According to still another aspect, an embodiment of the present application provides a communication system, where the system includes the radio access network device and the terminal device in the foregoing aspects.

According to yet another aspect, an embodiment of the present application provides a computer storage medium, configured to store a computer software instruction used by the radio access network device, where the computer software instruction includes a program designed for performing the foregoing aspect.

According to yet another aspect, an embodiment of the present application provides a computer storage medium, configured to store a computer software instruction used by the terminal device, where the computer software instruction includes a program designed for performing the foregoing aspect.

The solutions provided by the present application can improve data transmission efficiency in a scenario of short-duration burst interference. The embodiments ensure a low-latency requirement of a burst URLLC service, and support highly-efficient and flexible multiplexing between URLCC and eMBB services.

BRIEF DESCRIPTION OF DRAWINGS

The following briefly describes the accompanying drawings used in describing the embodiments.

DESCRIPTION OF EMBODIMENTS

Figure 1:
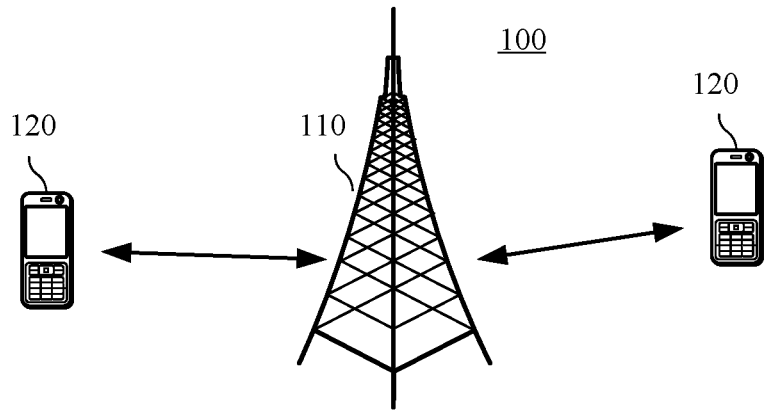
FIG. 1 is a schematic diagram of a possible application scenario of the embodiments of the present application.

FIG. 1 shows a communication system 100 in which embodiments of the present application can be implemented. The communication system 100 includes at least one radio access network device 110 and a plurality of terminal devices 120, located within coverage of the radio access network device 110. FIG. 1 shows one radio access network device and two terminal devices as an example. Optionally, the communication system 100 may include a plurality of radio access network devices, and a plurality of terminal devices may be within coverage of each radio access network device. This is not limited in the embodiments of the present application.

Optionally, the wireless communication system 100 may further include other network entities such as a network controller and a mobility management entity, but the embodiments of the present application are not limited thereto.

The communication system, to which the embodiments of the present application can be implemented, may be a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a wireless communication system in which an orthogonal frequency-division multiplexing (OFDM) technology is applied, a 5G communication system currently under development, any applicable future communication systems, or the like. System architectures and business scenarios described in the embodiments of the present application are for the purpose of more clearly describing the technical solutions in the embodiments of the present application, and are not intended to limit the scope of the technical solutions provided in the embodiments of the present application. As network architectures evolve and a new business scenario emerges, the technical solutions provided in the embodiments of the present application are further applicable to a similar technical problem.

The radio access network device in the embodiments of the present application may be used to provide a wireless communication function for a terminal device. The radio access network device may be a macro base station, a micro base station (also referred to as a small cell), a relay station, an access point, and the like in various forms. The radio access network device may be called a Base Transceiver Station (BTS) in the GSM system or CDMA system, a NodeB (NB) in the WCDMA system, an evolved NodeB (eNB, or e-NodeB) in the LTE system, or a corresponding device such as a gNB in a 5G communication network. For ease of description, in all embodiments of the present application, the foregoing apparatuses providing wireless communication functions for terminal devices are collectively referred to as a radio access network device.

In the embodiments of the present application, the terminal device may be referred to as user equipment device (UE), a mobile station (MS), a mobile terminal, or the like. The terminal device may communicate with one or more core networks by using a radio access network (RAN). For example, the terminal device may be a mobile phone (or referred to as a "cellular" phone) or a computer with a mobile terminal. The terminal device may be a portable, pocket-sized, handheld, computer built-in, or in-vehicle mobile apparatus, which exchanges voice and/or data with the radio access network. This is not specifically limited in the embodiments of the present application.

A transport block (TB) is used as a unit in data scheduling and corresponding HARQ feedback and possible HARQ retransmission in a current wireless communication system. In downlink data scheduling, for example, a PDSCH scheduled by a base station for a UE generally includes one or two TBs. Specifically, if the PDSCH includes one codeword, for example, in a non-MIMO (multiple-input and multiple-output) scheduling, the codeword corresponds to one TB. If the PDSCH includes two codewords, for example, in a case of MIMO scheduling, the codewords correspond to two TBs. For ease of description, in this specification, one TB corresponding to a single codeword is used as an example. For a plurality of codewords, separate processing may be performed in a manner similar to the processing of a single codeword. If the UE correctly receives the TB on the PDSCH, the UE feeds back an ACK on an uplink; otherwise, the UE feeds back a NACK. If the base station receives the NACK fed back by the UE, retransmission scheduling is subsequently performed for the TB that is not correctly received by the UE.

Considering complexity of coding/decoding and advantages of fast coding/decoding, one TB may be split into a plurality of code blocks (CBs) for separate channel coding/decoding. For example, for a Turbo code, generally a maximum quantity of bits in a CB is 6144. If a TB has more than 6144 bits, the TB needs to be split into a plurality of CBs for separate coding/decoding. For a low-density parity-check (LDPC) code, generally a maximum quantity of bits in a CB is approximately 2000 bits. This means a TB may be split into more CBs for parallel coding/decoding. Generally, each CB has an independent check function. For example, in a Turbo code, one or more CRC bits are added to each CB before coding. In this way, after the UE decodes each CB, the UE may determine, by performing a CRC check, whether a current CB is correctly decoded. For LDPC code, one or more CRC bits may also be added to each CB, or a coding matrix of the LDPC code itself has a check function, that is, each CB of the LDPC code may also have a check function.

Using a downlink as an example, to achieve fast coding/decoding, in mapping the coded modulation symbols to a physical resource, the coded modulation symbols are mapped first in frequency domain and then in time domain, and interleaving of the CBs is not performed. That is, the mapping is performed in a sequence of the CBs. An advantage of this is that the UE can start decoding when it buffers a CB, instead of waiting for all CBs on the PDSCH are buffered before starting decoding.

When a URLLC service punches an eMBB service, considering that data transmission time of the URLLC is relatively short, and there is a high probability that the URLLC service uses a time domain symbol and/or a subframe that is shorter than that of the eMBB service. The URLLC service may punch only a few time-frequency resource locations of the CBs on the PDSCH of the eMBB, for example, punching a time-frequency resource location of one or two CBs. As can be seen, the URLLC service punches the PDSCH of eMBB service to ensure a low-latency requirement of the URLLC service, and only a few CBs in a plurality of CBs in a TB on the PDSCH of eMBB service may be affected.

Assuming that a TB on the PDSCH of the eMBB service includes 30 CBs, in which only one or two CBs are not correctly received by the UE due to the punching by the URLLC service. However, even if only one CB in the TB is not correctly received, the entire TB will not pass a TB CRC. This means the UE will still consider that the entire TB is not correctly received, and feeds back a NACK to the base station. After receiving the NACK, the base station considers that the entire TB is not correctly received by the UE, although actually most CBs are correctly received. The base station performs a retransmission scheduling on the entire TB of the UE subsequently. Even if the entire TB is retransmitted, the UE cannot correctly receive the TB by performing HARQ combining. The reason is that the UE does not know which CB is punched by the URLLC service in the previous transmission. Therefore, at the same time the UE feeds back the NACK, a HARQ buffer of the UE may store a CB of the URLLC service instead of a CB of the eMBB intended for the UE. Therefore, when HARQ combining is performed with the retransmitted CB, not only a HARQ combining gain cannot be obtained, but also that the CB cannot be correctly received again. Finally, there is a high probability that a retransmission at a radio link control (RLC) layer is triggered, and system efficiency is reduced greatly.

To resolve a problem of system efficiency reduction caused by retransmission of an entire eMBB TB when only a few CBs are punched by a URLLC service, a HARQ feedback and retransmission based on units of CBs has been used in the prior art. Specifically, the UE provides separate HARQ feedbacks about whether each CB in the entire TB is correctly received, and the base station retransmits a CB that is not correctly received by the UE, or retransmits, by using an initial HARQ transmission, CBs that are not correctly received by the UE. After using a HARQ mechanism based on units of CBs, the base station knows which CBs in the TB are not correctly received by the UE. The incorrectly received CBs may include CBs punched by a URLLC service, or may include CBs that are not punched by the URLLC service but are not correctly received by the UE due to other reasons such as channel fading. For the CB punched by the URLLC service, the base station directly performs initial transmission scheduling subsequently to resolve the failure in receiving a retransmitted packet by performing HARQ combining because the HARQ buffer of the UE is contaminated by the URLLC service. For the CB that is not punched by the URLLC service but is not correctly received by the UE due to other reasons such as channel fading, the base station may normally perform retransmission scheduling, and the UE may normally perform HARQ combining to increase a probability of correct reception.

Service transmission in an evolved LTE system or an NR system is still scheduled by the base station. A normal data transmission procedure is: adding one or more CRC bits to original data bits and performing encoding to form a codeword; performing scrambling and constellation modulation on the codeword to form a modulation symbol; mapping the modulation symbol to time, frequency, and space resources, where the space resource is intended for a multi-antenna transmission mode; and finally, transforming the data to a time domain for transmission. This is the entire baseband data transmission procedure.

In an embodiment, to resolve a HARQ buffer contamination problem caused by HARQ combining, a radio access network device notifies a terminal device of indication information of an affected code block; and the terminal device determines a CB that is not correctly received, and uses a data packet retransmitted with respect to the CB to perform data recovery. When the radio access network device performs initial transmission or retransmission scheduling for the terminal device, the radio access network device notifies the terminal device of which CBs are punched by URLLC transmission during previous transmission (initial transmission or previous retransmission) of the current TB. After obtaining the punch information, when the terminal device performs HARQ combining on CBs that are not correctly received previously, the terminal device does not perform HARQ combining on the CBs that are punched, but can normally perform HARQ combining on CBs that are not punched.

Figure 2:
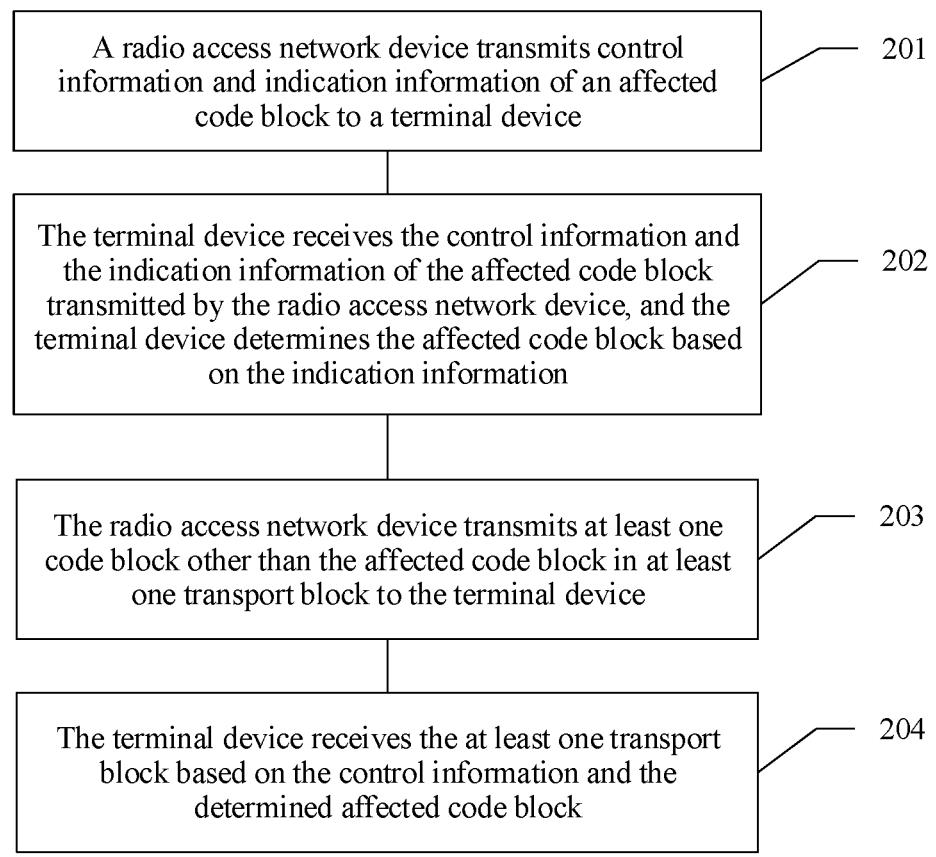
FIG. 2 is a flowchart of a data transmission method according to an embodiment of the present application.

Referring to FIG. 2, a data transmission method provided by an embodiment of the present application includes the following steps.

S201. A radio access network device transmits control information and indication information of an affected code block to a terminal device. The control information is used by the radio access network device to schedule a transport block of the terminal device. The transport block includes one or more code blocks, and the affected code block is one of the code blocks in the transport block.

Optionally, the transport block may be a transport block in initial HARQ transmission or HARQ retransmission.

In an embodiment, the control information may be carried on a downlink control channel. Optionally, the control information may include control information such as resource allocation information of a downlink data channel carrying the TB, a modulation and coding scheme, and a HARQ. Optionally, the control information may schedule one TB in one subframe, or may schedule a plurality of TBs in a plurality of subframes respectively. It should be noted that, herein the mentioned subframe is conceptually a minimum time granularity for scheduling a TB, and other names such as a mini-subframe, a slot, and a mini-slot may be used in a future evolved LTE system or an NR system, but they are the same in essence. A subframe is used as an example for description in the present application.

Optionally, the control information and the indication information of the affected code block is carried in a same message. For example, the indication information of the affected code block and the control information are carried on a downlink control channel. Optionally, the control information and the indication information of the affected code block are also be carried in different messages. The control information is carried on a downlink control channel, but the indication information of the affected code block may be carried on an independent control channel.

In an embodiment, if the transport block is a transport block in HARQ retransmission, the control information carries the indication information of the affected code block. If the transport block is a transport block in initial HARQ transmission, the control information does not carry the indication information of the affected code block. In another embodiment, the transport block is a transport block in HARQ retransmission, and the indication information of the affected code block is carried in a modulation and coding indication field in the control information.

Optionally, the affected code block is a code block corresponding to a resource that is overwritten by or suffers interference from other transmission information in a resource occupied during transmission of the transport block. Being affected may include the following manners (but is not limited to the following manners):

(a) The resource for the affected code block in the TB transmitted by the radio access network device is overwritten (or rewritten) by other service data (such as URLLC). To be specific, the radio access network device does not transmit, on the resource for the affected code block, information of the affected code block that should be transmitted, but transmits information of the other service data on the resource.

(b) Information transmitted on the resource for the affected code block in the TB transmitted by the radio access network device suffers interference from other service data (such as URLLC), that is, superposition transmission. Specifically, information transmitted on the TB is normally transmitted on the resource, and information of the other service data is also transmitted on the same resource.

S202. The terminal device determines the affected code block based on the indication information of the affected code block.

The terminal device receives the control information and the indication information of the affected code block transmitted by the radio access network device. The terminal device determines the affected code block based on the indication information.

After receiving the indication information of the affected code block, the terminal device parses the indication information of the affected code block based on a quantity of resources occupied by the transport block or a quantity of code blocks included in the transport block. Optionally, a granularity of parsing the indication information of the affected code block may be determined based on the quantity of resources occupied by the transport block or the quantity of code blocks included in the transport block.

S203. The radio access network device transmits at least one code block other than the affected code block in the transport block to the terminal device.

It should be noted that, the affected code block may be punched or suffer interference. If the affected code block is punched, a part or all of mapped resources of the affected CB that is coded and constellation-modulated may be used by the radio access network device to transmit other emergency services. To be specific, the radio access network device may not transmit, on the part or all of the resources, information of the affected CB that is coded and constellation-modulated. If the affected code block suffers interference, the radio access network device still normally transmits, on the mapped resources of the affected CB that is coded and constellation-modulated, information of the affected CB, but may also superpose, on the part or all of the mapped resources of the affected CB, other emergency services for transmission.

S204. The terminal device receives the transport block based on the control information and the determined affected code block.

In one embodiment, if the transport block is a transport block in HARQ retransmission, the terminal device does not perform HARQ combining on data corresponding to the affected code block.

If the transport block is a transport block in initial HARQ transmission and the affected code block is not correctly received, the terminal device does not store, in a HARQ buffer, data corresponding to the affected code block.

In this embodiment, the indication information of the affected code block may be an explicit indication or an implicit indication, or may be a direct indication or an indirect indication. The indication information of the affected code block may include a plurality of types of information.

In an embodiment, the indication information of the affected code block includes identifier information of the affected code block. Further, the identifier information of the affected code block may include: (1) an index of the affected code block; or (2) a group index of the affected code block; or (3) an index of a first code block, where the affected code block includes a code block before or after the first code block in sequence, or the affected code block includes the first code block and a code block before or after the first code block in sequence; or (4) an index of a first code block group, where the affected code block includes a code block before or after the first code block group in sequence, or the affected code block includes the first code block group and a code block before or after the first code block group in sequence. It should be noted that, the first code block may also be understood as a reference code block.

In another embodiment, the indication information of the affected code block includes identifier information of a resource corresponding to the affected code block. Specifically, the identifier information of the resource corresponding to the affected code block may include: (1) an index of the resource corresponding to the affected code block; or (2) a group index of the resource corresponding to the affected code block; or (3) an index of a resource corresponding to a first code block, where the affected code block includes a code block before or after the first code block in sequence, or the affected code block includes the first code block and a code block before or after the first code block in sequence; or (4) an index of a resource group corresponding to a first code block, where the affected code block includes a code block before or after the first code block group in sequence, or the affected code block includes the first code block group and a code block before or after the first code block group in sequence. It should be noted that, the resource corresponding to the first code block may also be understood as a resource corresponding to a reference code block. Optionally, the resource corresponding to the affected code block may be a resource occupied by the affected CB during current transmission of the transport block, or may be a resource occupied by the affected CB during previous transmission (herein the previous transmission may be initial HARQ transmission of the transport block, or may be previous HARQ retransmission of the transport block) of the transport block relative to current transmission.

The sequence in this embodiment may be a time sequence, a frequency sequence, or a logical sequence. For the time sequence, a plurality of code blocks included in a transport block may be mapped in a frequency-time sequence during resource mapping, so that resources of the plurality of code blocks are mapped in the time sequence. For example, a code block 1 is mapped to time domain symbols 1 and 2, and a code block 2 is mapped to time domain symbols 3 and 4. It should be noted that, the frequency-time mapping manner is merely an example, and other mapping manners are not excluded as long as they can reflect a solution in which the resources of the plurality of code blocks are mapped in the time sequence. For the frequency sequence, a plurality of code blocks included in a transport block may be mapped in a time-frequency sequence during resource mapping, so that resources of the plurality of code blocks are mapped in the frequency sequence. For example, a code block 1 is mapped to frequency domain subcarriers 1 to 12, and a code block 2 is mapped to frequency domain subcarriers 13 to 24. It should be similarly noted that, the time-frequency mapping manner is merely an example, and other solutions are not excluded as long as they can achieve similar frequency sequences. For the logical sequence, a plurality of code blocks may be logically ordered before resource mapping, but the logical ordering may be changed during resource mapping. To be specific, physical resource mapping is performed based on a preset correspondence between the logical ordering and physical resource mapping.

In another embodiment, the indication information of the affected code block may include information about whether the affected code block exists. For example, the indication information of the affected code block indicates two states. One state is "not affected", that is, not punched or not suffering interference. The other state is "affected", that is, punched or suffering interference. A granularity of this indication manner is coarsest. To be specific, which CBs in the TB are affected cannot be specifically indicated, or which part of resources to which the TB is mapped cannot be specifically indicated, but this indication manner minimizes signaling overheads. If the terminal device determines that a code block is affected, the terminal device performs HARQ combining on none of CBs that are not correctly received in the TB, although some CBs that are not correctly received are not punched or do not suffer interference. Specifically, for example, the indication information of the affected code block is a 1-bit explicit indication or an implicit indication of two scrambling manners. Other similar indication methods are not limited either.

Figure 3:
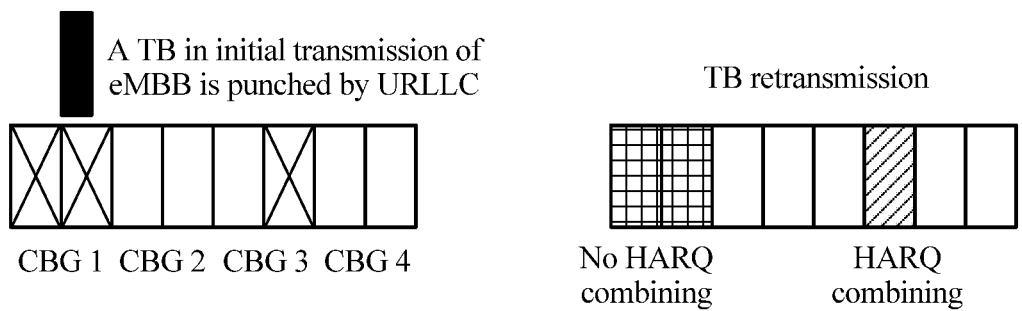
FIG. 3 is a schematic diagram of a method for indicating an affected code block.

For example, the indication information of the affected code block includes the index of the affected code block. Assuming that one TB includes four CBs, four bits may be respectively used to indicate which one or more of the four CBs are affected, and other explicit or implicit indication manners are not limited. For example, the indication information of the affected code block includes the group index of the affected code block. Referring to FIG. 3, one TB includes eight CBs, that is, four code block groups (CBGs), and four bits may be respectively used to indicate which one or more of the four CBGs are affected. Specifically, a state of the four bits is '1000', that is, a first CBG is affected.

Figure 4:
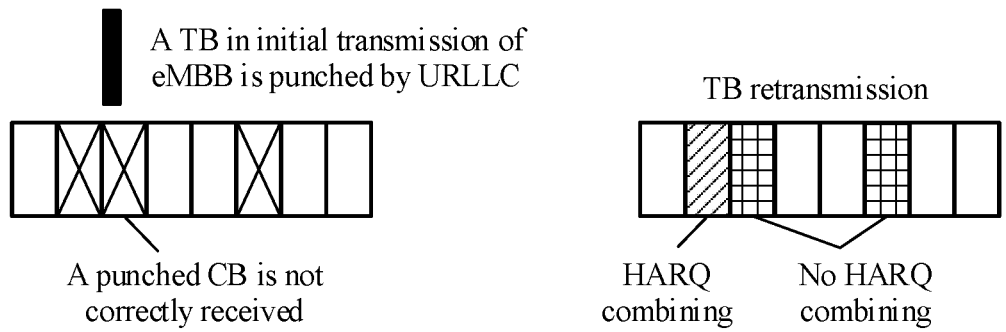
FIG. 4 is a schematic diagram of another method for indicating an affected code block.

One TB may include a maximum number of CBs, for example, the maximum number is 64 CBs, and 64-bit indication overheads are unbearable. Therefore, a method for reducing overheads is as follows: The indication information of the affected code block is used to indicate a reference affected CB; and then the terminal device determines, by using a preset rule, other potential affected CBs correlated with the reference affected CB. It should be noted that, the other potential affected CBs are not necessarily affected CBs. Specifically, using FIG. 4 as an example, assuming that one TB includes eight CBs and that a third CB shown in FIG. 4 is an affected CB, the indication information may indicate that the third CB is an affected CB. The terminal device determines, according to a preset rule, that CBs after the reference affected CB are all potential affected CBs, that is, a sixth CB is also considered as an affected CB, although the sixth CB is not actually affected. However, a second CB is not an affected CB. Therefore, when receiving retransmission scheduling of the TB, the terminal device performs HARQ combining on the second CB, but does not perform HARQ combining on the third and sixth CBs.

As can be seen, the preset rule is: the affected code blocks correlated with the reference affected code block include the reference affected code block and the affected code block before or after the reference affected code block in sequence. It should be noted that, herein the sequence may be an absolute time sequence and/or an absolute frequency sequence, or may be a logical index sequence. For example, the index sequence shown in FIG. 4 may also be understood as an ascending time sequence in which the CBs are mapped.

The indication information of the affected code block may also include the identifier information of the resource corresponding to the affected code block. The resource may be a time domain resource or a frequency domain resource. The transport block is finally mapped to a time-frequency resource. For example, assuming that the control information schedules one TB in one subframe, the subframe may be divided into six time slices, and the indication information of the affected code block may indicate one or more of the time slices as an affected time slice. Therefore, the terminal device may determine, based on the affected time slice, which CBs in the TB mapped by the base station in the affected time slice are affected CBs, and further determine not to perform HARQ combining on the affected CBs when receiving the retransmitted CBs. For descriptions about other aspects, refer to the foregoing embodiment. A manner of dividing a plurality of subframes and other resources, for example, a two-dimensional time-frequency division manner, is not limited.

Optionally, the granularity of parsing the indication information of the affected code block may be determined based on the quantity of resources occupied by the at least one transport block or the quantity of code blocks included in the at least one transport block.

Using indication information of a fixed quantity of states, for example, 16 states of four bits, as an example, if the control information schedules downlink data of two subframes, where each subframe includes one TB, and one TB includes six CBs, first two bits of the indication information of the affected code block are used to indicate parsing of an affected CB or CBG in a first subframe, and last two bits of the indication information of the affected code block are used to indicate parsing of an affected CB or CBG in a second subframe. Specifically, each subframe is indicated based on a granularity of 1 CBG=2 CBs. For the first subframe, a state '00' of the first two bits of the indication information of the affected code block indicates "not affected", '01' indicates that a first CBG is a reference affected CBG, '10' indicates that a second CBG is a reference affected CBG, and '11' indicates that a third CBG is a reference affected CBG. A method for indicating the second subframe is similar. If the control information schedules downlink data of one subframe, a 4-bit indication may be provided based on a CB granularity. Specifically, '0000' indicates "not affected", and '0001' to '0110' indicate which of a first to a sixth CBs is a reference affected CB.

Using indication information of a fixed quantity of states, for example, 16 states of four bits, as an example, if the control information schedules downlink data of two subframes, where each subframe includes six time slices, first two bits of the indication information of the affected code block are used to indicate parsing of an affected time slice in a first subframe, and last two bits of the indication information of the affected code block are used to indicate parsing of an affected time slice in a second subframe. Specifically, each subframe is indicated based on a granularity of 1 time slice group=2 time slices. For the first subframe, a state '00' of the first two bits of the indication information of the affected code block indicates "not affected", '01' indicates that a first time slice group is a reference affected time slice group, '10' indicates that a second time slice group is a reference affected time slice group, and '11' indicates that a third time slice group is a reference affected time slice group. A method for indicating the second subframe is similar. If the control information schedules downlink data of one subframe, a 4-bit indication may be provided based on a time slice granularity. Specifically, '0000' indicates "not affected", and '0001' to '0110' indicate which of a first to a sixth CBs is a reference affected time slice. If a time slice is indicated, the terminal device may determine a CB or a CBG mapped to the time slice, that is, determine an affected CB or CBG.

In this embodiment, because the radio access network device indicates the affected code block to the terminal device, the terminal device may not buffer the affected code block or the terminal device does not perform HARQ combining on the data corresponding to the affected code block. This resolves a HARQ buffer contamination problem, and ensures data transmission efficiency in a scenario of short-duration burst interference. This embodiment ensures a low-latency requirement of a burst URLLC service, and resolves highly-efficient and flexible multiplexing between URLCC and eMBB services.

Figure 5:
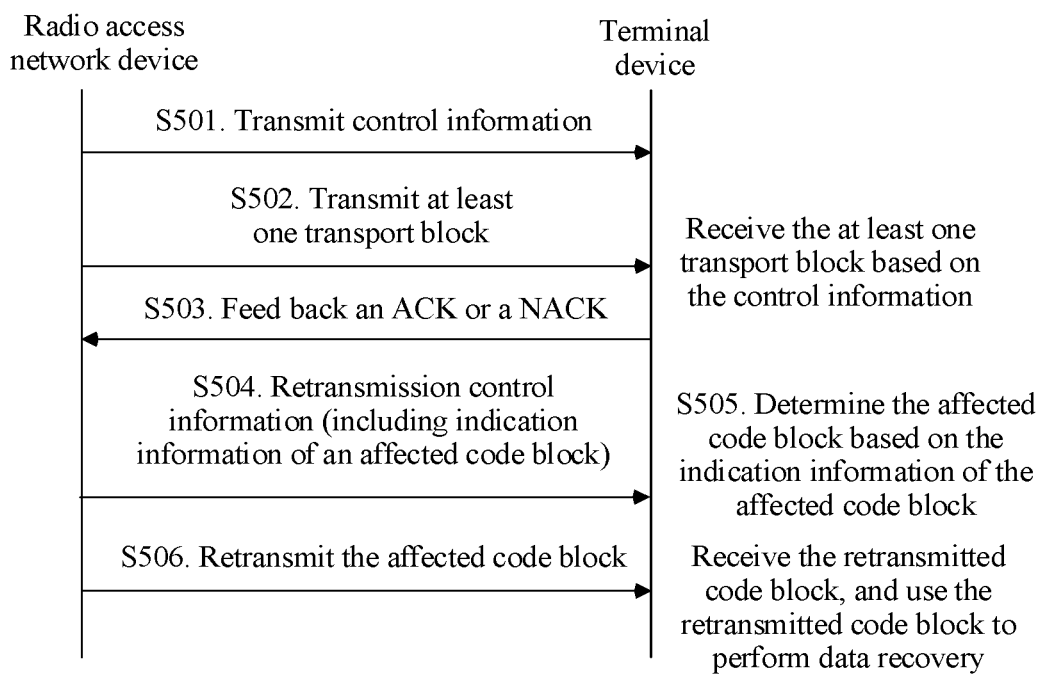
FIG. 5 is a flowchart of a data transmission method according to another embodiments of the present application.

Referring to FIG. 5, in a data transmission method according to another embodiment of the present application, indication information of an affected code block is carried in control information corresponding to a transport block in HARQ retransmission. The method includes the following steps.

S501. A radio access network device transmits control information to a terminal device, where the control information is used by the radio access network device to schedule at least one transport block of the terminal device, and each of the at least one transport block includes at least one code block.

The terminal device receives the control information.

S502. The radio access network device transmits the at least one transport block to the terminal device, and the terminal device receives the at least one transport block based on the control information.

S503. The terminal device feeds back an ACK or a NACK to the radio access network device.

The terminal device feeds back the ACK or NACK to the radio access network device based on a reception status of the transport block.

S504. When receiving the NACK feedback, the radio access network device transmits retransmission control information to the terminal device, where the retransmission control information is used by the radio access network device to schedule at least one transport block of the terminal device, each of the at least one transport block includes at least one code block, the retransmission control information includes indication information of an affected code block, and the affected code block is at least one code block in the at least one transport block.

For details about the control information, the affected code block, and the indication information of the affected code block, and the transmission method, refer to related descriptions in the foregoing embodiments.

S505. The terminal device receives the retransmission control information, and determines the affected code block based on the indication information of the affected code block in the retransmission control information.

For the method for parsing the indication information of the affected code block by the terminal device, refer to related descriptions in the foregoing embodiments.

S506. The radio access network device transmits the retransmitted affected code block to the terminal device, and the terminal device receives the retransmitted code block, and uses the retransmitted code block to perform data recovery.

The terminal device directly uses the retransmitted code block instead of performing HARQ combining.

Alternatively, in another embodiment, the indication information of the affected code block may not be included in the control information. For example, the control information is carried on a downlink control channel, and the control information is used to schedule the at least one transport block; however, the indication information of the affected code block may be carried on an independent control channel, that is, independent of the control information, and therefore also independent of the downlink control channel.

In this embodiment, the indication information of the affected code block exists only in retransmission scheduling. To be specific, for initial transmission scheduling, the indication information of the affected code block is not required. Generally, there is a high probability that URLLC service punches eMBB service only after control information and data information of eMBB start to be transmitted, that is, punch eMBB midway; however, when scheduling downlink data of eMBB, the radio access network device cannot predict that eMBB service is punched by a URLLC emergency service midway.

For a design of the indication information of the affected code block in retransmission scheduling, preferably, a modulation and coding scheme (MCS) field in the control information may be reused. Other indication manners, for example, using a new bit or a scrambling code, or reusing a conversional HARQ process number indication field other than the MCS field, are not limited either. The following describes an embodiment of reusing the MCS field in the control information. Table 1 shows a rule for parsing a current MCS field. As can be seen, the current MCS field is five bits, indicating 32 states, where state indexes 0 to 28 indicate 29 MCS levels and are used to query load indexes, but three states, that is, MCS indexes 29 to 31, are mainly used to change a modulation order during retransmission scheduling. In addition, for initial transmission scheduling, MCS indexes 0 to 28 and a time-frequency resource allocation field in the control information are jointly used to determine a load size. For retransmission scheduling, the load needs to be consistent with that in initial transmission, but a time-frequency resource occupied by a currently retransmitted TB is indicated by a dedicated field in the control information. Therefore, for retransmission scheduling, at least the MCS indexes 0 to 28 are redundant, and the MCS indexes 29 to 31 also have only a function of changing the modulation order during retransmission. However, generally, it is not quite necessary to change the modulation order during retransmission, and therefore, the MCS indexes 29 to 31 may also be considered as redundant.

Therefore, if the at least one transport block is a transport block in HARQ retransmission, the indication information of the affected code block includes some or all states in the modulation and coding indication field in the control information, and the modulation and coding indication field is used to indicate, to the terminal device during initial HARQ transmission of the at least one transport block, a modulation and coding scheme for the at least one transport block in initial HARQ transmission.

TABLE 1

MCS parsing rule

| MCS index | Modulation order | Load index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Figure 6:
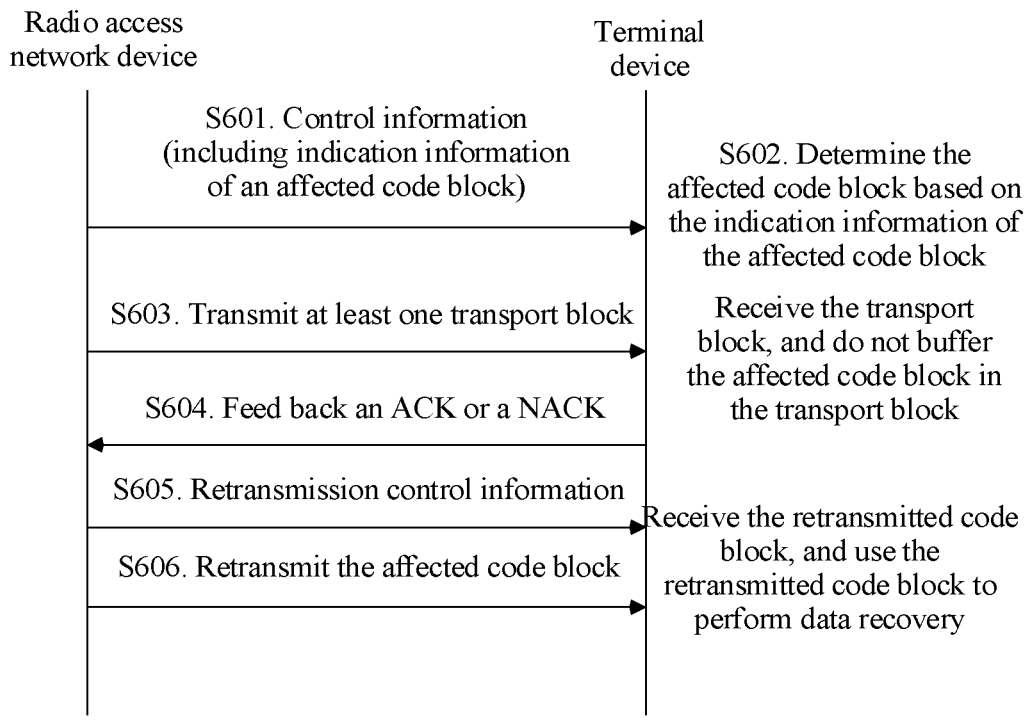
FIG. 6 is a schematic flowchart of a data transmission method according to yet another embodiments of the present application.

Referring to FIG. 6, in a data transmission method according to another embodiment of the present application, indication information of an affected code block is carried in control information corresponding to a transport block in initial HARQ transmission. The method includes the following steps.

S601. A radio access network device transmits control information to a terminal device, where the control information is used by the radio access network device to schedule at least one transport block of the terminal device, each of the at least one transport block includes at least one code block, the control information includes indication information of an affected code block, and the affected code block is at least one code block in the at least one transport block.

For details about of the control information, the affected code block, and the indication information of the affected code block, and the transmission method, refer to related descriptions in the foregoing embodiments.

S602. The terminal device determines the affected code block based on the indication information of the affected code block.

The terminal device receives the control information, and determines the affected code block based on the indication information of the affected code block.

For the method for parsing the indication information of the affected code block by the terminal device, refer to related descriptions in the foregoing embodiments.

S603. The radio access network device transmits a transport block to the terminal device, and the terminal device receives the transport block, but does not buffer an affected code block in the transport block.

S604. The terminal device feeds back an ACK or a NACK to the radio access network device.

The terminal device feeds back the ACK or NACK to the radio access network device based on a reception status of the transport block.

S605. After receiving the NACK feedback, the radio access network device transmits retransmission control information to the terminal device, where the retransmission control information is used by the radio access network device to schedule at least one transport block of the terminal device, and each of the at least one transport block includes at least one code block.

The terminal device receives the retransmission control information.

S606. The radio access network device transmits the affected code block to the terminal device, and the terminal device receives the affected code block, and uses the affected code block to perform data recovery.

The terminal device directly uses the retransmitted CB, instead of performing HARQ combining with the CB information in initial transmission.

Alternatively, in another embodiment, the indication information of the affected code block may not be included in the control information. For example, the control information is carried on a downlink control channel, and the control information is used to schedule the at least one transport block; however, the indication information of the affected code block may be carried on an independent control channel, that is, independent of the control information, and therefore also independent of the downlink control channel.

In this embodiment, information of the affected CB is indicated in initial transmission, so that the terminal device does not buffer the affected CB from the beginning. Further, a HARQ buffer contamination problem may be resolved with reference to other embodiments, for example, with reference to CB-level acknowledgement or negative acknowledgement information feedback, or HARQ retransmission efficiency may be enhanced with reference to other embodiments.

Corresponding to the foregoing method, the present application provides a terminal device. The terminal device may be applied to a scenario in which short-duration burst interference occurs in a wireless system, and the terminal device can perform each step in the foregoing method embodiment.

Figure 7:
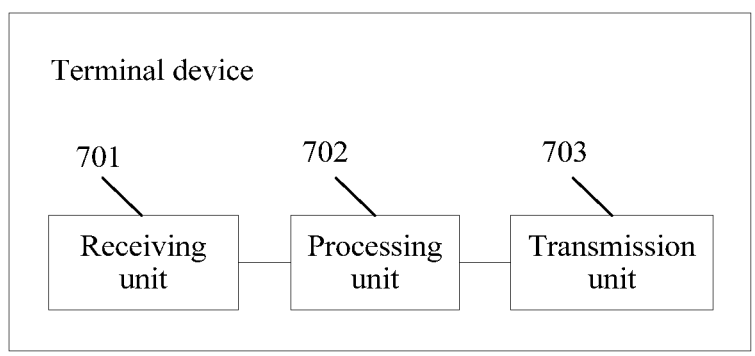
FIG. 7 is a simplified block diagram of a terminal device according to an embodiment of the present application.

Referring to FIG. 7, in an embodiment, the terminal device includes:

a receiving unit 701, configured to receive control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block; and a processing unit 702, configured to determine the affected code block based on the indication information of the affected code block, where the receiving unit 701 is further configured to receive the at least one transport block based on the control information and the determined affected code block.

For details about of the control information, the affected code block, and the indication information of the affected code block, and the transmission method, refer to related descriptions in the foregoing embodiments.

Optionally, if the at least one transport block is a transport block in HARQ retransmission, the control information carries the indication information of the affected code block; or if the at least one transport block is a transport block in initial HARQ transmission, the control information does not carry the indication information of the affected code block.

Optionally, the at least one transport block is the transport block in HARQ retransmission, and the indication information of the affected code block is carried in a modulation and coding indication field in the control information. For a specific design, refer to related descriptions in the foregoing embodiments.

Optionally, if the at least one transport block is the transport block in HARQ retransmission, the receiving unit is configured to receive the at least one transport block, and skip performing HARQ combining on data corresponding to the affected code block.

Optionally, the terminal device further includes:

a transmission unit 703, configured to transmit first indication information to the radio access network device, where the first indication information indicates whether a second code block is correctly received, the second code block is a code block other than the affected code block in the at least one code block, and a quantity of bits included in the first indication information is less than a quantity of second code blocks.

For details about the first indication information and the transmission method, refer to related descriptions in the foregoing embodiments.

Figure 8:
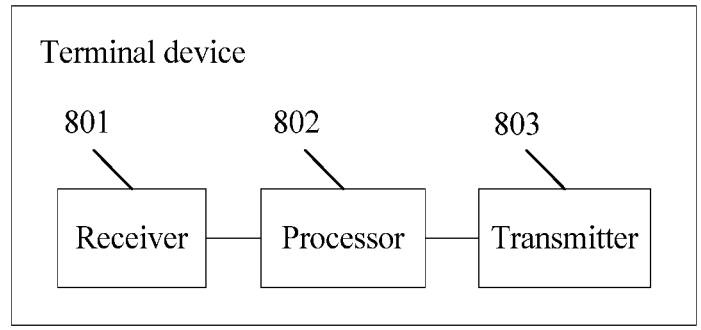
FIG. 8 is a simplified block diagram of a terminal device according to another embodiments of the present application.

Referring to FIG. 8, in another embodiment, the terminal device includes:

a receiver 801, configured to receive control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block; and a processor 802, configured to determine the affected code block based on the indication information of the affected code block, where the receiver 801 is further configured to receive the at least one transport block based on the control information and the determined affected code block.

For details about of the control information, the affected code block, and the indication information of the affected code block, and the transmission method, refer to related descriptions in the foregoing embodiments.

Optionally, the terminal device further includes:

a transmitter 803, configured to transmit first indication information to the radio access network device, where the first indication information indicates whether a second code block is correctly received, the second code block is a code block other than the affected code block in the at least one code block, and a quantity of bits included in the first indication information is less than a quantity of second code blocks.

For details about of the first indication information and the transmission method, refer to related descriptions in the foregoing embodiments.

The processor in this embodiment can perform steps in the foregoing method embodiments. For details, refer to the foregoing method embodiments.

Corresponding to the foregoing method, the present application provides a radio access network device. The radio access network device may be applied to a scenario in which short-duration burst interference occurs in a wireless system, and the radio access network device can perform each step in the foregoing method embodiments.

Figure 9:
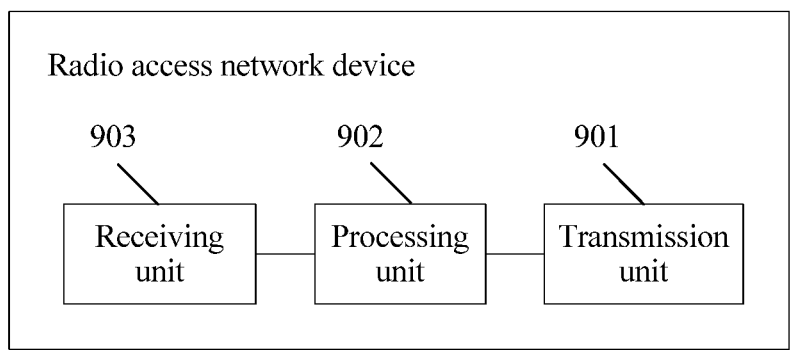
FIG. 9 is a simplified block diagram of a radio access network device according to an embodiment of the present application.

Referring to FIG. 9, in an embodiment, the radio access network device includes:

a transmission unit 901, configured to transmit control information and indication information of an affected code block to a terminal device, where the control information is used by the radio access network device to schedule at least one transport block of the terminal device, each of the at least one transport block includes at least one code block, and the affected code block is at least one code block in the at least one transport block, where the transmission unit 901 is further configured to transmit at least one code block other than the affected code block in the at least one transport block to the terminal device.

For details about of the control information, the affected code block, and the indication information of the affected code block, and the transmission method, refer to related descriptions in the foregoing embodiments.

Optionally, the radio access network device further includes a processing unit 902, configured to determine to transmit the control information and the indication information of the affected code block.

Optionally, if the at least one transport block is a transport block in HARQ retransmission, the control information carries the indication information of the affected code block; or if the at least one transport block is a transport block in initial HARQ transmission, the control information does not carry the indication information of the affected code block.

Further, the at least one transport block is the transport block in HARQ retransmission, and the indication information of the affected code block is carried in a modulation and coding indication field in the control information.

Optionally, the radio access network device further includes:

a receiving unit 903, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

For details about of the first indication information and the transmission method, refer to related descriptions in the foregoing embodiments.

Figure 10:
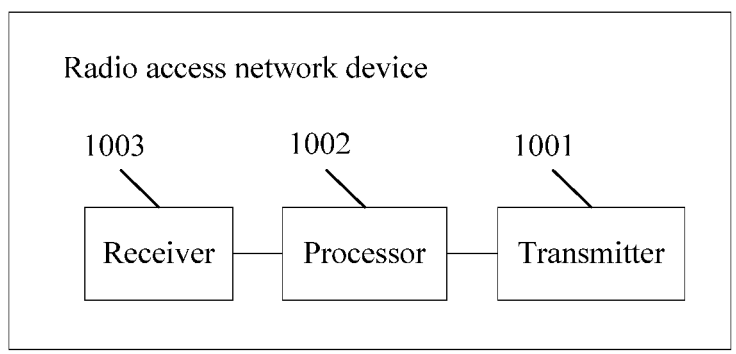
FIG. 10 is a simplified block diagram of a radio access network device according to another embodiment of the present application.

Referring to FIG. 10, in another embodiment, the radio access network device includes:

a transmitter 1001, configured to transmit control information and indication information of an affected code block to a terminal device, where the control information is used by the radio access network device to schedule at least one transport block of the terminal device, each of the at least one transport block includes at least one code block, and the affected code block is at least one code block in the at least one transport block, where the transmitter 1001 is further configured to transmit at least one code block other than the affected code block in the at least one transport block to the terminal device.

For details about of the control information, the affected code block, and the indication information of the affected code block, and the transmission method, refer to related descriptions in the foregoing embodiments.

Optionally, the radio access network device further includes a processor 1002, configured to determine to transmit the control information and the indication information of the affected code block.

Optionally, if the at least one transport block is a transport block in HARQ retransmission, the control information carries the indication information of the affected code block; or if the at least one transport block is a transport block in initial HARQ transmission, the control information does not carry the indication information of the affected code block.

Further, the at least one transport block is the transport block in HARQ retransmission, and the indication information of the affected code block is carried in a modulation and coding indication field in the control information.

Optionally, the radio access network device further includes:

a receiver 1003, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

For details about of the first indication information and the transmission method, refer to related descriptions in the foregoing embodiments.

In another embodiment, to resolve a low efficiency problem caused by retransmission of an entire TB because partial CBs are punched, a terminal device performs different processing on affected CBs and other CBs, and feeds back ACKs or NACKs separately.

Figure 11:
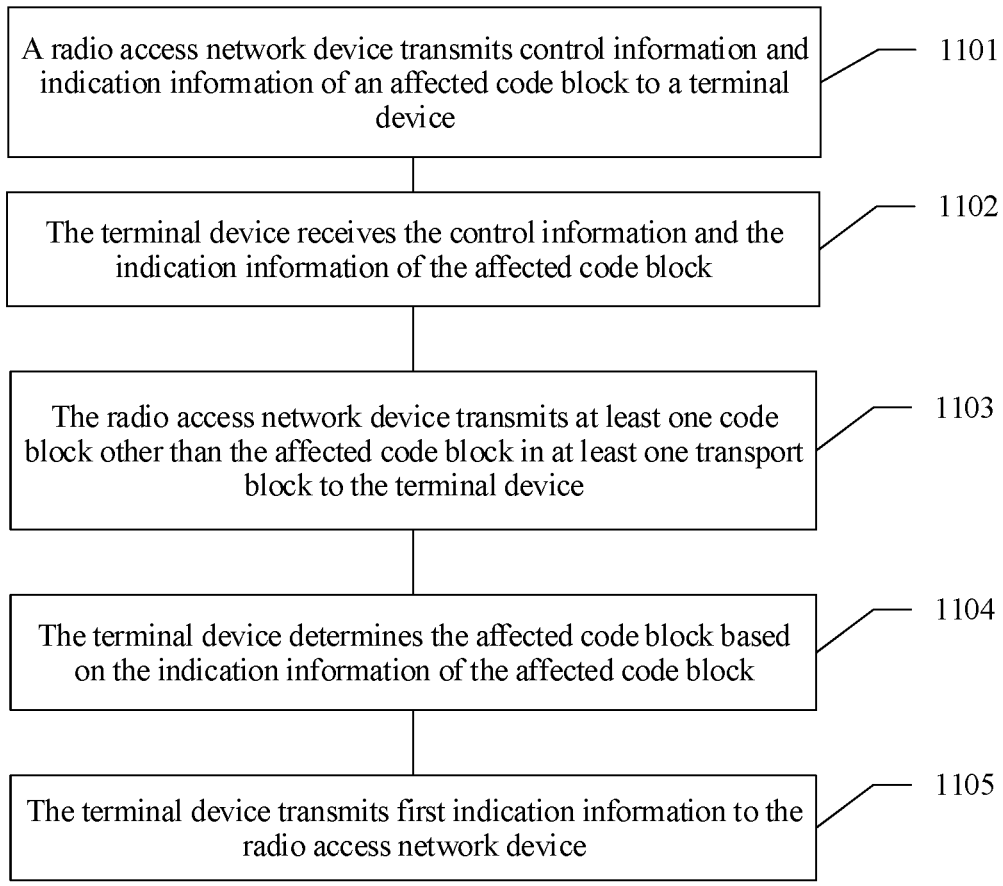
FIG. 11 is a s flowchart of a data transmission method according to another embodiment of the present application.

Referring to FIG. 11, another embodiment of a data transmission method according to the present application includes the following steps.

S1101. A radio access network device transmits control information and indication information of an affected code block to a terminal device, where the control information is used by the radio access network device to schedule at least one transport block of the terminal device, each of the at least one transport block includes at least one code block, and the affected code block is at least one code block in the at least one transport block.

For details about of the transport block, the control information, the affected code block, and the indication information of the affected code block, and the transmission method, refer to related descriptions in the foregoing embodiments.

S1102. The terminal device receives the control information and the indication information of the affected code block transmitted by the radio access network device.

S1103. The radio access network device transmits at least one code block other than the affected code block in the at least one transport block to the terminal device.

The terminal device receives the at least one transport block based on the control information.

S1104. The terminal device determines the affected code block based on the indication information of the affected code block.

It should be understood that, there is no strict sequence between step 1103 and step 1104.

S1105. The terminal device transmits first indication information to the radio access network device, where the first indication information indicates whether a second code block is correctly received, the second code block is a code block other than the affected code block in the at least one code block, and a quantity of bits included in the first indication information is less than a quantity of second code blocks.

Further, the radio access network device receives the first indication information transmitted by the terminal device.

In an embodiment, if all the second code blocks are correctly received, the terminal device transmits a piece of N-bit acknowledgement information (ACK) to the radio access network device; or if at least one second code block is not correctly received, the terminal device transmits a piece of N-bit negative acknowledgement information (NACK) to the radio access network device, where N is a positive integer less than the quantity of second code blocks.

In an embodiment, the quantity of bits included in the first indication information is less than the quantity of second code blocks. Specifically, considering that overheads of separately feeding back acknowledgement or negative acknowledgement bits for the second code blocks are relatively high, and that a plurality of code blocks are probably correlated in regard to whether the code blocks are correctly received, reducing the overheads of the acknowledgement or negative acknowledgement bits corresponding to the quantity of second code blocks may be considered. For example, a solution such as bundling acknowledgement or negative acknowledgement information of partial code blocks for feedback is used. For example, there are 16 second code blocks, and every eight code blocks may be grouped. In this case, only two acknowledgement or negative acknowledgement bits need to be fed back.

In another embodiment, the quantity of bits in the first indication information is 1; and that the terminal device transmits first indication information to the radio access network device includes: If all the second code blocks are correctly received, the terminal device transmits an acknowledgement bit to the radio access network device; or if at least one second code block is not correctly received, the terminal device transmits a negative acknowledgement bit to the radio access network device.

In this embodiment, the terminal device separately feeds back whether an affected code block in a TB is correctly received and whether another code block (that is, a second code block) is correctly received. In an implementation, the terminal device may transmit the first indication information and second indication information to the radio access network device separately, where the first indication information is used to indicate whether the second code block is correctly received, and the second indication information is used to indicate whether the affected code block is correctly received. Optionally, similar to bundling feedback of the first indication information, a similar solution may also be used for transmitting the second indication information. To be specific, a quantity of bits included in the second indication information is less than a quantity of affected code blocks. In another implementation, the terminal device may transmit only the first indication information to the radio access network device, but does not transmit, to the radio access network device, indication information about whether the affected code block is correctly received. Because a probability that the affected code block is not correctly received is relatively high, a NACK may be considered by default, and no explicit feedback is provided, so as to reduce signaling overheads.

In an embodiment, if all the affected code blocks are correctly received, the terminal device transmits a piece of N-bit acknowledgement information (ACK) to the radio access network device; or if at least one affected code block is not correctly received, the terminal device transmits a piece of N-bit negative acknowledgement information (NACK) to the radio access network device, where N is a positive integer less than the quantity of affected code blocks.

In another embodiment, the quantity of bits in the second indication information is 1; and that the terminal device transmits second indication information to the radio access network device includes: If all the affected code blocks are correctly received, the terminal device transmits an acknowledgement bit to the radio access network device; or if at least one affected code block is not correctly received, the terminal device transmits a negative acknowledgement bit to the radio access network device.

Optionally, the method further includes: The radio access network device receives the first indication information, and determines, based on the first indication information, whether to retransmit the second code block. Specifically, if the first indication information is acknowledgement information (ACK), the second code block does not need to be retransmitted; or if the first indication information is negative acknowledgement information (NACK), the second code block is retransmitted.

Optionally, the method further includes: The radio access network device receives the second indication information, and determines, based on the second indication information, whether to retransmit the affected code block. Specifically, if the second indication information is acknowledgement information (ACK), the affected code block does not need to be retransmitted; or if the second indication information is negative acknowledgement information (NACK), the affected code block is retransmitted.

In an embodiment, the radio access network device receives the first indication information and the second indication information, and determines, based on the first indication information and the second indication information, whether to retransmit the second code block and the affected code block separately.

In another embodiment, the radio access network device receives only the first indication information, and determines, based on the first indication information, whether to retransmit the affected code block. The radio access network device does not receive the second indication information, but considers negative acknowledgement information for the affected code block by default, and retransmits the affected code block. Because a probability that the affected code block is not correctly received is relatively high, a NACK may be considered by default, and no explicit feedback is provided, so as to reduce signaling.

Optionally, the method further includes:

S1106. The terminal device receives the at least one transport block based on the control information and the determined affected code block.

For a specific implementation of this step, refer to related descriptions of step S204 in FIG. 2.

Optionally, the method further includes:

the terminal device receives a code block that is not correctly received in the second code block and is retransmitted by the radio access network device; or the terminal device receives the affected code block and a code block that is not correctly received in the second code block, retransmitted by the radio access network device.

Currently, an ACK or a NACK is fed back based on a TB. To be specific, as long as at least one CB in the TB is not correctly received, the terminal device feeds back a one-bit NACK with respect to the TB. A radio access network device cannot know which one or more CBs in the TB are not correctly received by the terminal device, especially considering that a CB that is not punched may not be correctly received due to reasons such as channel fading. Therefore, the base station can only choose to retransmit the entire TB.

However, in this embodiment, for a scenario in which eMBB service is punched by URLLC service, there is a high probability that a punched CB is not correctly received, but different from the prior art, which CB is not correctly received depends on channel randomicity. Therefore, a CB affected by punching and a CB not affected by punching are processed differently, and an ACK or a NACK is fed back separately. For example, a TB includes eight CBs, assuming that six CBs are not punched and are marked as a CB 1 to a CB 6, and remaining two CBs are punched and are marked as a CB 7 and a CB 8. Optionally, the terminal device reports two bits with respect to the TB, where one bit is with respect to the CB 7 and the CB 8; because the CB 7 and the CB 8 are basically not correctly received, this bit is basically a NACK. Assuming that the CB 1 to the CB 6 are all correctly received, a 1-bit ACK is fed back; or if at least one of the CB 1 to the CB 6 is not correctly received, a 1-bit NACK is fed back. Optionally, the terminal device may not feedback an ACK or a NACK with respect to the affected CBs, but provide feedback only with respect to the other CBs. To be specific, because the CB 7 and the CB 8 are basically not correctly received, no ACK or NACK is fed back with respect to the CB 7 and the CB 8, but a 1-bit ACK or NACK is fed back with respect to the CB 1 to the CB 6.

It should be understood that, the method embodiments corresponding to FIG. 2, FIG. 5, and FIG. 6 may be combined with the method embodiment corresponding to FIG. 11. For example, the method embodiments corresponding to FIG. 2, FIG. 5, and FIG. 6 may further include step S1108: The terminal device transmits first indication information to the radio access network device, where the first indication information indicates whether a second code block is correctly received, the second code block is a code block other than the affected code block in the at least one code block, and a quantity of bits included in the first indication information is less than a quantity of second code blocks. Alternatively, the method embodiments corresponding to FIG. 2, FIG. 5, and FIG. 6 may further include step S1109: The terminal device may transmit the first indication information and second indication information to the radio access network device separately, where the first indication information is used to indicate whether a second code block is correctly received, and the second indication information is used to indicate whether the affected code block is correctly received. For a specific implementation of step S1108 and step S1109, refer to related descriptions of step S1105 in FIG. 11.

Corresponding to the foregoing method, the present application provides a terminal device. The terminal device may be applied to a scenario in which short-duration burst interference occurs in a wireless system, and the terminal device can perform each step in the foregoing method embodiment.

Figure 12:
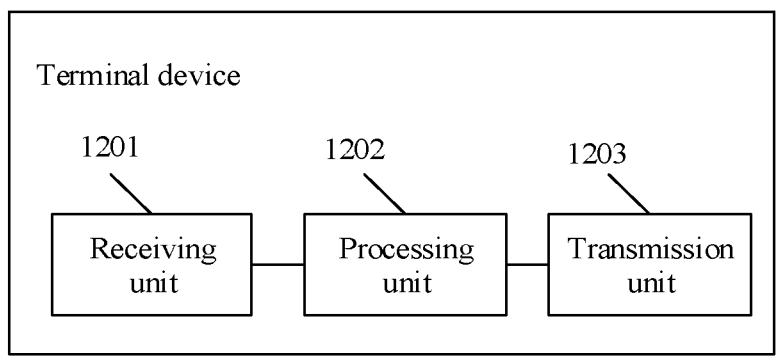
FIG. 12 is a simplified block diagram a terminal device according to another embodiment of the present application.

Referring to FIG. 12, in an embodiment, the terminal device includes:

a receiving unit 1201, configured to: receive control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block; and receive the at least one transport block based on the control information;

a processing unit 1202, configured to determine, by the terminal device, the affected code block based on the indication information of the affected code block, and determine first indication information, where the first indication information indicates whether a second code block is correctly received, the second code block is a code block other than the affected code block in the at least one code block, and a quantity of bits included in the first indication information is less than a quantity of second code blocks; and a transmission unit 1203, configured to transmit the first indication information to the radio access network device.

For details about of the control information, the affected code block, and the indication information of the affected code block, and the transmission method, refer to related descriptions in the foregoing embodiments.

Optionally, the processing unit is further configured to determine second indication information, where the second indication information is used to indicate whether the affected code block is correctly received; and the transmission unit is further configured to transmit the second indication information to the radio access network device.

For details about of the first indication information and the second indication information, and the transmission method, refer to related descriptions in the foregoing embodiments.

Optionally, the terminal device does not transmit, to the radio access network device, indication information about whether the affected code block is correctly received.

Optionally, the indication information of the affected code block includes identifier information of the affected code block or identifier information of a resource corresponding to the affected code block.

Figure 13:
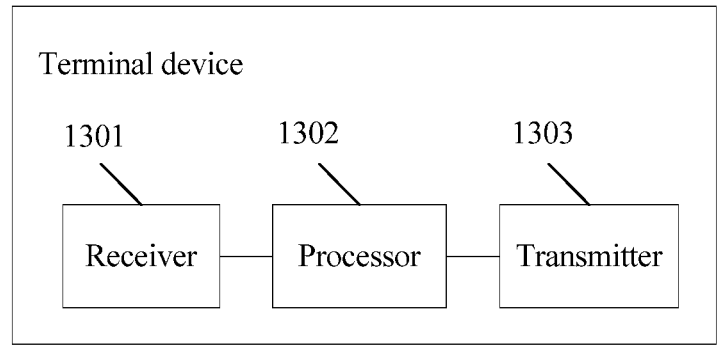
FIG. 13 is a simplified block diagram of a terminal device according to another embodiment of the present application.

Referring to FIG. 13, in another embodiment, the terminal device includes:

a receiver 1301, configured to: receive control information and indication information of an affected code block transmitted by a radio access network device, where the control information is used by the radio access network device to schedule at least one transport block of the terminal device, each of the at least one transport block includes at least one code block, and the affected code block is at least one code block in the at least one transport block; and receive the at least one transport block based on the control information;

a processor 1302, configured to determine, by the terminal device, the affected code block based on the indication information of the affected code block, and determine first indication information, where the first indication information indicates whether a second code block is correctly received, the second code block is a code block other than the affected code block in the at least one code block, and a quantity of bits included in the first indication information is less than a quantity of second code blocks; and a transmitter 1303, configured to transmit the first indication information to the radio access network device.

For details about of the control information, the affected code block, and the indication information of the affected code block, and the transmission method, refer to related descriptions in the foregoing embodiments.

Optionally, the processor is further configured to determine second indication information, where the second indication information is used to indicate whether the affected code block is correctly received; and the transmitter is further configured to transmit the second indication information to the radio access network device.

For details about of the first indication information and the second indication information, and the transmission method, refer to related descriptions in the foregoing embodiments.

Optionally, the terminal device does not transmit, to the radio access network device, indication information about whether the affected code block is correctly received.

Optionally, the indication information of the affected code block includes identifier information of the affected code block or identifier information of a resource corresponding to the affected code block.

Corresponding to the foregoing method, the present application provides a radio access network device. The radio access network device may be applied to a scenario in which short-duration burst interference occurs in a wireless system, and the radio access network device can perform each step in the foregoing method embodiment.

Figure 14:
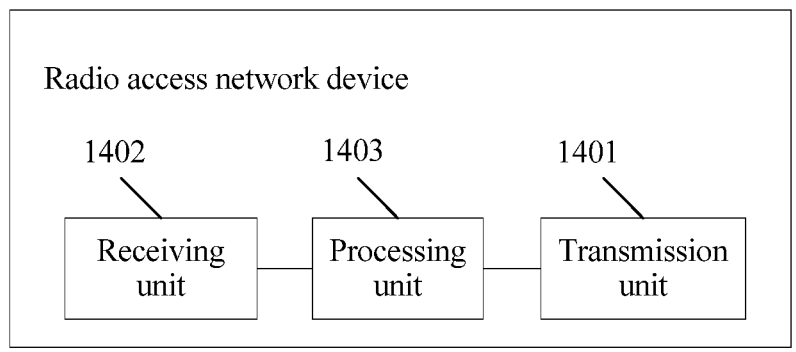
FIG. 14 is a simplified block diagram of a radio access network device according to another embodiment of the present application.

Referring to FIG. 14, in an embodiment, the radio access network device includes:

a transmission unit 1401, configured to: transmit control information and indication information of an affected code block to a terminal device, where the control information is used by the radio access network device to schedule at least one transport block of the terminal device, each of the at least one transport block includes at least one code block, and the affected code block is at least one code block in the at least one transport block; and transmit at least one code block other than the affected code block in the at least one transport block to the terminal device; and a receiving unit 1402, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

Optionally, the radio access network device further includes a processing unit 1403, configured to determine to transmit the control information and the indication information of the affected code block.

Optionally, the receiving unit is further configured to receive second indication information transmitted by the terminal device, where the second indication information indicates whether the affected code block is correctly received, and a quantity of bits included in the second indication information is less than a quantity of affected code blocks.

Optionally, the radio access network device does not receive second indication information, where the second indication information is used to indicate whether the affected code block is correctly received.

For details about of the control information, the affected code block, and the indication information of the affected code block, and the transmission method, refer to related descriptions in the foregoing embodiments.

For details about of the first indication information and the second indication information, and the transmission method, refer to related descriptions in the foregoing embodiments.

Figure 15:
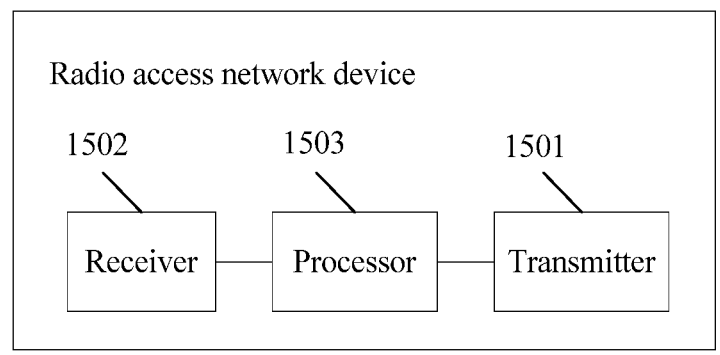
FIG. 15 is a simplified block diagram of a radio access network device according to another embodiment of the present application.

Referring to FIG. 15, in another embodiment, the radio access network device includes:

a transmitter 1501, configured to: transmit control information and indication information of an affected code block to a terminal device, where the control information is used by the radio access network device to schedule at least one transport block of the terminal device, each of the at least one transport block includes at least one code block, and the affected code block is at least one code block in the at least one transport block; and transmit at least one code block other than the affected code block in the at least one transport block to the terminal device; and a receiver 1502, configured to receive first indication information transmitted by the terminal device, where the first indication information indicates whether a second code block is correctly received, the second code block is a code block other than the affected code block in the at least one code block, and a quantity of bits included in the first indication information is less than a quantity of second code blocks.

Optionally, the radio access network device further includes a processor 1503, configured to determine to transmit the control information and the indication information of the affected code block.

Optionally, the receiver is further configured to receive second indication information transmitted by the terminal device, where the second indication information indicates whether the affected code block is correctly received, and a quantity of bits included in the second indication information is less than a quantity of affected code blocks.

Optionally, the radio access network device does not receive second indication information, where the second indication information is used to indicate whether the affected code block is correctly received.

For details about of the control information, the affected code block, and the indication information of the affected code block, and the transmission method, refer to related descriptions in the foregoing embodiments.

For details about of the first indication information and the second indication information, and the transmission method, refer to related descriptions in the foregoing embodiments.

In another embodiment, to resolve a low efficiency problem caused by retransmission of an entire TB because partial CBs are punched, considering that overheads of uplink transmission of CB-level acknowledgement or negative acknowledgement information are relatively high, the present application provides the following embodiment, based on an assumption that there is a high probability that an affected CB is not correctly received by a terminal device and that a probability of incorrect reception of a CB not affected is not high. This embodiment uses retransmission of partial code blocks to achieve a compromise between retransmission efficiency and uplink transmission overheads.

Figure 16:
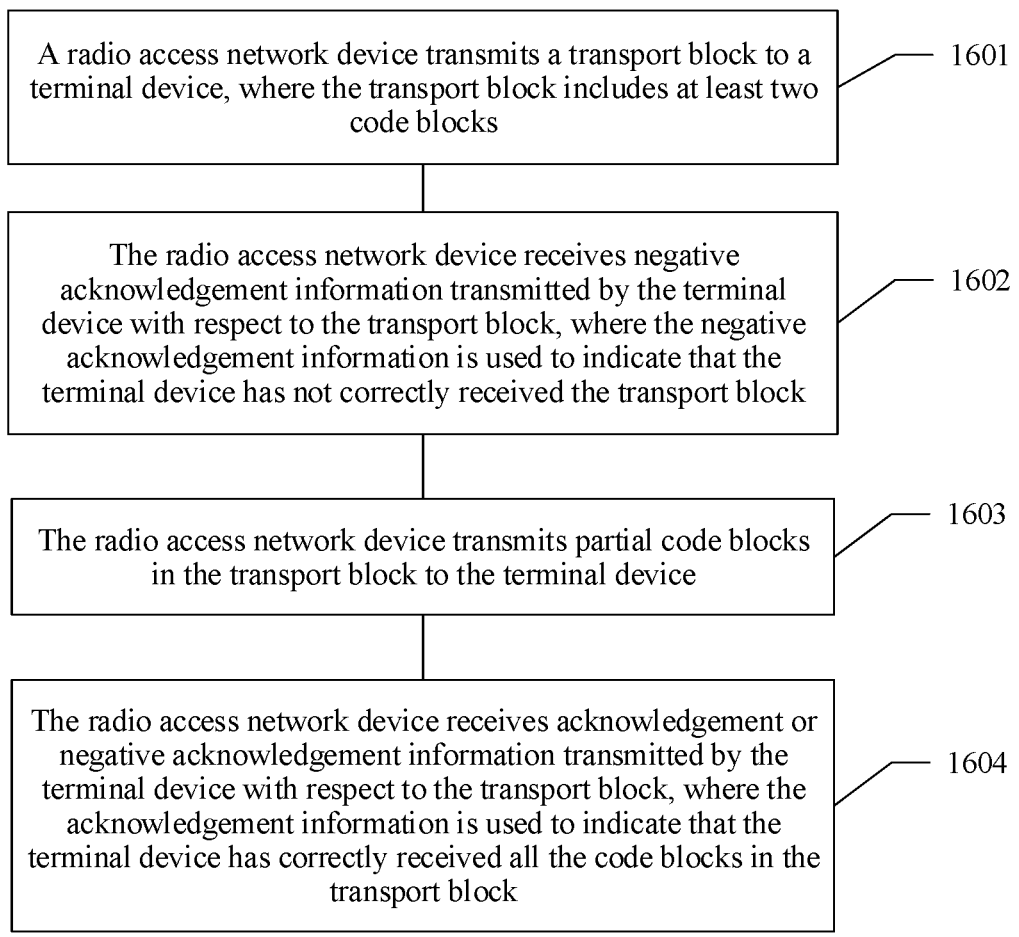
FIG. 16 is a flowchart of a data transmission method according to another embodiment of the present application.

Referring to FIG. 16, an embodiment of a data transmission method provided by the present application may be applied to a radio access network device, and the method includes the following steps.

S1601. A radio access network device transmits a transport block to a terminal device, where the transport block includes at least two code blocks.

For details about of the transport block and the code blocks, refer to related descriptions in the foregoing embodiments.

S1602. The radio access network device receives negative acknowledgement information transmitted by the terminal device with respect to the transport block, where the negative acknowledgement information is used to indicate that the terminal device has not correctly received the transport block.

If the terminal device cannot correctly receive all code blocks in the transport block, the terminal device feeds back a negative acknowledgement bit with respect to the transport block to the radio access network device. Herein the acknowledgement or negative acknowledgement information feedback may be based on a transport block level in an existing LTE system, instead of based on a code block level.

It should be noted that, partial code blocks in the transport block may be punched by another emergency service or suffer burst interference, and consequently there is a high probability that the terminal device does not correctly receive the partial code blocks. The partial code blocks may include the affected code block described in the foregoing embodiments. For details about related to the affected code block, refer to related descriptions in the foregoing embodiments.

In comparison, a probability that other code blocks than the partial code blocks in the transport block are correctly received by the terminal device is relatively high, and a probability of incorrect reception due to poor channel conditions is relatively low.

S1603. The radio access network device transmits partial code blocks in the transport block to the terminal device.

Specifically, considering that the partial code blocks in the transport block transmitted by the radio access network device to the terminal device in step S1601 suffer burst interference and are even punched by an emergency service, there is an extremely high probability that the partial code blocks cannot be correctly received by the terminal device. However, although other code blocks that are not affected may not be correctly received due to poor channel conditions either, a probability that the event occurs is generally not high. Therefore, after the negative acknowledgement information fed back by the terminal device with respect to the transport block is received, or even before the radio access network device receives the acknowledgement or negative acknowledgement information fed back by the terminal device with respect to the transport block (this means that step S1602 may be optional, or at least does not need to be performed before step S1603), to enhance HARQ retransmission efficiency and further increase a system throughput, the radio access network device may transmit the partial code blocks in the transport block to the terminal device, but does not retransmit the other code blocks than the partial code blocks in the transport block. To be specific, the radio access network device temporarily assumes that the other code blocks have been correctly received by the terminal device.

S1604. The radio access network device receives acknowledgement or negative acknowledgement information transmitted by the terminal device with respect to the transport block, where the acknowledgement information is used to indicate that the terminal device has correctly received all the code blocks in the transport block.

Specifically, even if the radio access network device retransmits only the partial code blocks in the transport block in step S1603, the acknowledgement or negative acknowledgement information is transmitted by the terminal device and received by the radio access network device with respect to all the code blocks in the entire transport block. A main reason is that the radio access network device cannot determine whether the other code blocks than the partial code blocks in the transport block are correctly received by the terminal device. Specifically, the following cases are included:

If the terminal device still cannot correctly receive the partial code blocks retransmitted by the radio access network device, the terminal device feeds back negative acknowledgement information to the radio access network device;

if the terminal device has correctly received the partial code blocks retransmitted by the radio access network device, and the terminal device also has correctly received the other code blocks than the partial code blocks in the transport block transmitted by the radio access network device in the foregoing step S1601, the terminal device feeds back acknowledgement information to the radio access network device; and if the terminal device has correctly received the partial code blocks retransmitted by the radio access network device, but the terminal device has not correctly received at least one of the other code blocks than the partial code blocks in the transport block transmitted by the radio access network device in the foregoing step S1601, the terminal device feeds back negative acknowledgement information to the radio access network device.

To resolve the low efficiency problem caused by retransmission of an entire TB because partial CBs are punched, considering that overheads of uplink feedback of CB-level acknowledgement or negative acknowledgement information are relatively high, the present application provides the foregoing embodiment, based on an assumption that there is a high probability that an affected CB is not correctly received by the terminal device and that a probability of incorrect reception of a CB not affected is not high. This embodiment uses retransmission of partial code blocks to achieve a compromise between retransmission efficiency and uplink feedback overheads.

Based on the foregoing data transmission method, optionally, a HARQ process number used when the radio access network device transmits the transport block to the terminal device is the same as a HARQ process number used when the radio access network device transmits the partial code blocks in the transport block to the terminal device.

Specifically, the acknowledgement or negative acknowledgement information corresponding to the partial code blocks retransmitted in S1603 is fed back with respect to all the code blocks in the entire transport block. Therefore, the HARQ process number used when the partial code blocks are transmitted in step S1603 is the same as the HARQ process number used when the entire transport block is transmitted in step S1601. The HARQ process number may be explicitly included in control information that schedules the transport block or the partial code blocks, or may be implicitly determined by the radio access network device and the terminal device. For example, the HARQ process number may correspond to a resource, where the resource may include at least one of a time resource, a frequency resource, and a space resource. A specific manner of determining the HARQ process number is not limited, as long as it can be ensured that the HARQ process numbers used respectively in the foregoing two steps are the same. To be specific, the radio access network device and the terminal device need to both consider that the two steps correspond to the same process number. In this way, a correspondence between the transport block and the feedback information can be consistent.

Based on the foregoing data transmission method, optionally, the radio access network device transmits first scheduling information to the terminal device, where the first scheduling information is used to indicate transmission information of the partial code blocks to the terminal device, and the transmission information of the partial code blocks includes whether the transmission is transmission of the partial code blocks and/or indexes of the partial code blocks.

It should be understood that, in HARQ retransmission in the conversional LTE system, all code blocks in an entire transport block need to be retransmitted. Therefore, a terminal device may use the rule by default. Therefore, there is no need to additionally notify the terminal device of which code blocks are retransmitted. However, as described in step S1603 of the present application, the radio access network device retransmits the partial code blocks to the terminal device. This is different from a HARQ retransmission mechanism in the conversional LTE system. Therefore, the terminal device needs to be notified of the transmission information of the partial code blocks, specifically including whether current HARQ retransmission is transmission of the partial code blocks and/or the indexes of the partial code blocks.

If the transmission information of the partial code blocks includes whether the transmission is transmission of the partial code blocks, whether the current HARQ retransmission is transmission of the partial code blocks or retransmission of the entire transport block in the conventional LTE system needs to be indicated to the terminal device, and the first scheduling information may be carried in the control information scheduling the partial code blocks in step S1603. In addition, if that the current HARQ retransmission is retransmission of the partial code blocks is indicated to the terminal device, which specific code blocks are the partial code blocks, for example, code block indexes of partial code blocks or an index of a code block group, need to be further indicated to the terminal device. Specifically, the method for indicating the first scheduling information is not limited. For example, the first scheduling information may be explicitly indicated by using a bit in the control information, for example, using a new bit or reusing an existing bit (for example, all or some states of an MCS field), or the first scheduling information may be indicated in different scrambling manners of the control information, or the first scheduling information may be indicated implicitly based on a resource location in which a control channel and/or a data channel are/is transmitted, where the data channel is a channel carrying the transport block or the partial code blocks, or the first scheduling information is indicated by using a combination of the explicit and implicit methods.

If the transmission information of the partial code blocks includes which code blocks are the partial code blocks, for example, the code block indexes of the partial code blocks or the index of the code block group, the information about whether the transmission is transmission of the partial code blocks may be included or may not be included. Specifically, the manner of indicating the first scheduling information is not limited. For details, refer to the descriptions in the foregoing embodiments.

Based on the foregoing data transmission method, optionally, before the radio access network device receives the negative acknowledgement information transmitted by the terminal device with respect to the transport block, the method includes: the radio access network device transmits second scheduling information to the terminal device, where the second scheduling information is used by the terminal device to indicate the indexes of the partial code blocks, and the second scheduling information is the control information scheduling the transport block in the foregoing step S1601. A specific indication method is described above, and is not described again herein.

Optionally, after the radio access network device receives the negative acknowledgement information transmitted by the terminal device with respect to the transport block, the method includes: The radio access network device transmits third scheduling information to the terminal device, where the third scheduling information is used to indicate, to the terminal device, the information about whether the transmission is transmission of the partial code blocks. The third scheduling information is the control information scheduling the partial code blocks in the foregoing step S1603. A specific indication method is described above, and is not described again herein.

Figure 17:
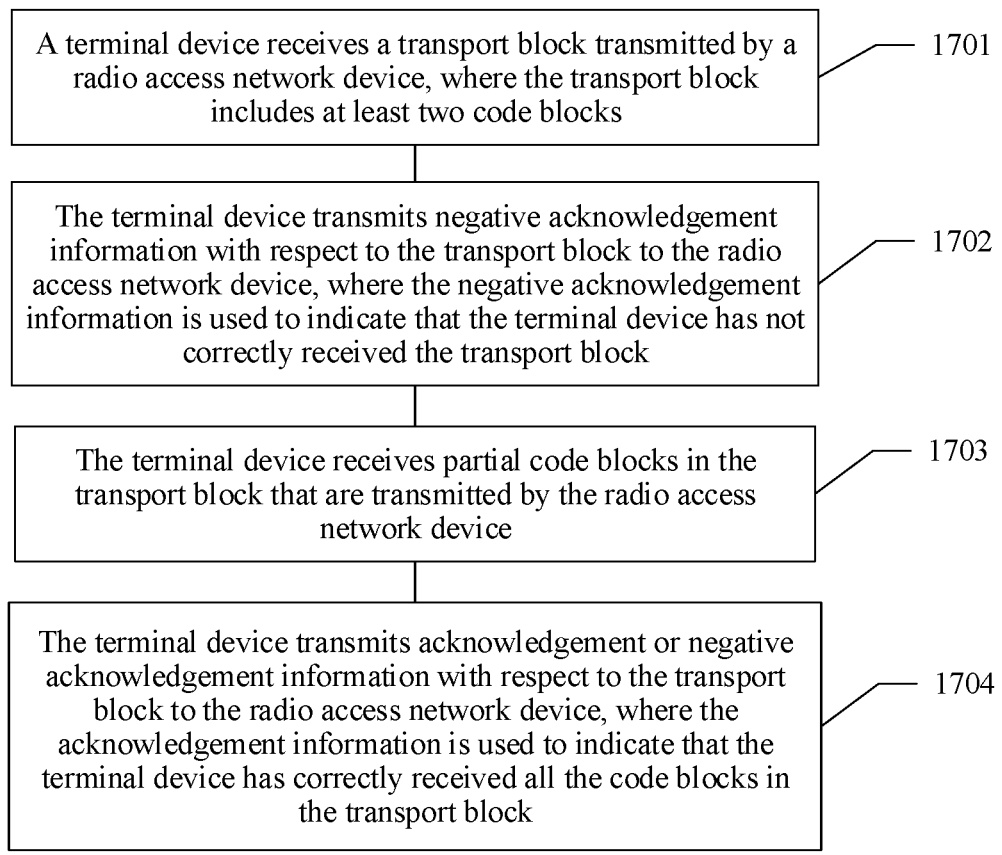
FIG. 17 is a flowchart of a data transmission method according to another embodiment of the present application.

Referring to FIG. 17, an embodiment of a data transmission method provided by the present application may be applied to a terminal device, and the method includes the following steps.

S1701. A terminal device receives a transport block transmitted by a radio access network device, where the transport block includes at least two code blocks.

S1702. The terminal device transmits negative acknowledgement information with respect to the transport block to the radio access network device, where the negative acknowledgement information is used to indicate that the terminal device has not correctly received the transport block.

S1703. The terminal device receives partial code blocks in the transport block that are transmitted by the radio access network device.

S1704. The terminal device transmits acknowledgement or negative acknowledgement information with respect to the transport block to the radio access network device, where the acknowledgement information is used to indicate that the terminal device has correctly received all the code blocks in the transport block.

Based on the foregoing data transmission method, optionally, a HARQ process number used when the terminal device receives the transport block is the same as a HARQ process number used when the terminal device receives the partial code blocks in the transport block.

Based on the foregoing data transmission method, optionally, the terminal device receives first scheduling information, and the terminal device determines transmission information of the partial code blocks based on the first scheduling information, where the transmission information of the partial code blocks includes whether the transmission is transmission of the partial code blocks and/or indexes of the partial code blocks.

Based on the foregoing data transmission method, optionally, before the terminal device transmits the negative acknowledgement information with respect to the transport block to the radio access network device, the method includes: the terminal device receives second scheduling information, and the terminal device determines the indexes of the partial code blocks based on the second scheduling information; and after the terminal device transmits the negative acknowledgement information with respect to the transport block to the radio access network device, the method includes: the terminal device receives third scheduling information, and the terminal device determines, based on the third scheduling information, information about whether the transmission is transmission of the partial code blocks.

For details about, refer to the descriptions in the method embodiments on the radio access network device side. Details are not described again herein.

Corresponding to the foregoing methods, the present application provides embodiments of a terminal device and a radio access network device, where the terminal device and the radio access network device may respectively perform each step in the foregoing method embodiments.

An embodiment of a radio access network device provided by the present application includes:

a transmission module, configured to transmit a transport block to a terminal device, where the transport block includes at least two code blocks; and a receiving module, configured to receive negative acknowledgement information transmitted by the terminal device with respect to the transport block, where the negative acknowledgement information is used to indicate that the terminal device has not correctly received the transport block, where the transmission module is further configured to transmit partial code blocks in the transport block to the terminal device; and the receiving module is further configured to receive acknowledgement or negative acknowledgement information transmitted by the terminal device with respect to the transport block, where the acknowledgement information is used to indicate that the terminal device has correctly received all the code blocks in the transport block.

Optionally, a HARQ process number used when the radio access network device transmits the transport block to the terminal device is the same as a HARQ process number used when the radio access network device transmits the partial code blocks in the transport block to the terminal device.

Optionally, the radio access network device transmits first scheduling information to the terminal device, where the first scheduling information is used to indicate transmission information of the partial code blocks to the terminal device, and the transmission information of the partial code blocks includes whether the transmission is transmission of the partial code blocks and/or indexes of the partial code blocks.

Optionally, before the radio access network device receives the negative acknowledgement information transmitted by the terminal device with respect to the transport block, the method includes: the radio access network device transmits second scheduling information to the terminal device, where the second scheduling information is used by the terminal device to indicate the indexes of the partial code blocks; and after the radio access network device receives the negative acknowledgement information transmitted by the terminal device with respect to the transport block, the method includes: the radio access network device transmits third scheduling information to the terminal device, where the third scheduling information is used to indicate, to the terminal device, the information about whether the transmission is transmission of the partial code blocks.

For details about, refer to the descriptions in the method embodiments on the radio access network device side. Details are not described again herein.

A terminal device provided by embodiments of the present application includes:

a receiving module, configured to receive a transport block transmitted by a radio access network device, where the transport block includes at least two code blocks; and a transmission module, configured to transmit, by the terminal device, negative acknowledgement information with respect to the transport block to the radio access network device, where the negative acknowledgement information is used to indicate that the terminal device has not correctly received the transport block, where the receiving module is further configured to receive partial code blocks in the transport block that are transmitted by the radio access network device; and the transmission module is further configured to transmit, by the terminal device, acknowledgement or negative acknowledgement information with respect to the transport block to the radio access network device, where the acknowledgement information is used to indicate that the terminal device has correctly received all the code blocks in the transport block.

Based on the foregoing terminal device, optionally, a HARQ process number used when the terminal device receives the transport block is the same as a HARQ process number used when the terminal device receives the partial code blocks in the transport block.

Based on the foregoing terminal device, optionally, the terminal device receives first scheduling information, and the terminal device determines transmission information of the partial code blocks based on the first scheduling information, where the transmission information of the partial code blocks includes whether the transmission is transmission of the partial code blocks and/or indexes of the partial code blocks.

Based on the foregoing terminal device, optionally, before the terminal device transmits the negative acknowledgement information with respect to the transport block to the radio access network device, the terminal device receives second scheduling information, and the terminal device determines the indexes of the partial code blocks based on the second scheduling information; and after the terminal device transmits the negative acknowledgement information with respect to the transport block to the radio access network device, the terminal device receives third scheduling information, and the terminal device determines, based on the third scheduling information, information about whether the transmission is transmission of the partial code blocks.

For details about, refer to the descriptions in the method embodiments on the terminal device side. Details are not described again herein.

It may be understood that, the receiving module and the transmission module in the foregoing embodiments may be respectively a receiver and a transmitter in hardware, or may be both integrated into a transceiver.

In one or more of the foregoing examples, the functions described in the embodiments of the present application may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general or dedicated computer.

The objectives, technical solutions, and benefit effects of the present application are further described in detail in the foregoing specific embodiments. It should be understood that the foregoing descriptions are merely specific embodiments of the present application, but are not intended to limit the protection scope of the present application. Any modification, equivalent replacement, or improvement made based on the technical solutions of the present application shall fall within the protection scope of the present application.

What is claimed is:

1. A method for receiving information, comprising:
   receiving, by a terminal device, downlink control information from a radio access network device, wherein the downlink control information indicates a retransmission of a code block group, the code block group is one of a plurality of code block groups of a transport block that the terminal device received from the radio access network device, the code block group comprises a plurality of code blocks, and at least one code block in the code block group was not transmitted correctly;
   receiving, by the terminal device, the retransmission of the code block group from the radio access network device; and
   restoring, by the terminal device, information carried in the received transport block according to the retransmitted code block group;
   wherein the downlink control information comprises identification information and indication information, wherein the identification information identifies which code block group of the transport block is retransmitted, wherein the indication information indicates whether the code block group from a previous transmission is punctured or interfered, and wherein the indication information further indicates, according to a preset rule, at least one other potential affected code block: that is in a code block group other than the code block group from the previous transmission that was punctured or interfered; and that is correlated.

2. The method of claim 1, further comprising:
   transmitting, by the terminal device, acknowledgement information in response to the retransmitted code block group to the radio access network device.

3. The method of claim 1, wherein the at least one code block in the code block group that was not transmitted correctly was partially replaced or superimposed by data from another transmission flow that is different from a transmission flow that carries the transport block.

4. The method according to claim 1, wherein the restoring information carried in the received transport block comprises:
   decoding, by the terminal device, the received transport block by excluding information in the code block group in the received transport block and including information in the retransmitted code block group, in instance that the indication information indicating the code block group of the transport block from the previous transmission is punctured or interfered.

5. The method according to claim 1, wherein a HARQ process number used when the terminal device receives the transport block from the radio access network device is the same as a HARQ process number used when the terminal device receives the retransmission of the code block group from the radio access network device.

6. A terminal device, comprising:
   a processor, a transceiver, and a memory unit storing program instructions;
   wherein when executed by the processor, the program instructions enable the terminal device to perform the following steps:
   receiving downlink control information from a radio access network device, wherein the downlink control information indicates a retransmission of a code block group, the code block group is one of a plurality of code block groups of a transport block that the terminal device received from the radio access network device, the code block group comprises a plurality of code blocks, and at least one code block in the code block group was not transmitted correctly;
   receiving the retransmission of the code block group from the radio access network device; and
   restoring information carried in the received transport block according to the retransmitted code block group;
   wherein the downlink control information comprises identification information and indication information, the identification information identifies which code block group of the transport block is retransmitted, and the indication information indicates whether the code block group from a previous transmission is punctured or interfered, and wherein the indication information further indicates, according to a preset rule, at least one other potential affected code block: that is in a code block group other than the code block group from the previous transmission that was punctured or interfered; and that is correlated to the at least one code block in the code block group was not transmitted correctly.

7. The terminal device according to claim 6, wherein the terminal device is further enabled to perform the step of:
   transmitting acknowledgement information in response to the retransmitted code block group to the radio access network device.

8. The terminal device according to claim 6, wherein the at least one code block in the code block group that was not transmitted correctly was partially replaced or superimposed by data from another transmission flow that is different from a transmission flow that carries the transport block.

9. The terminal device according to claim 6, wherein in the restoring information carried in the received transport block, the terminal device is enabled to perform the step of:
   decoding the received transport block by excluding information in the code block group in the received transport block and including information in the retransmitted code block group, in instance that the indication information indicating the code block group of the transport block from the previous transmission is punctured or interfered.

10. The terminal device according to claim 6, wherein a HARQ process number used when the terminal device receives the transport block from the radio access network device is the same as a HARQ process number used when the terminal device receives the retransmission of the code block group from the radio access network device.

11. A non-transitory storage medium storing computer program codes which, when executed by a processor of a communication device, cause the communication device to perform the steps of:

receiving downlink control information from a radio access network device, wherein the downlink control information indicates a retransmission of a code block group, the code block group is one of a plurality of code block groups of a transport block that the communication device received from the radio access network device, the code block group comprises a plurality of code blocks, and at least one code block in the code block group was not transmitted correctly;

receiving the retransmission of the code block group from the radio access network device; and restoring information carried in the received transport block according to the retransmitted code block group;

wherein the downlink control information comprises identification information and indication information, the identification information identifies which code block group of the transport block is retransmitted, and the indication information indicates whether the code block group from a previous transmission is punctured or interfered, and wherein the indication information further indicates, according to a preset rule, at least one other potential affected code block: that is in a code block group other than the code block group from the previous transmission that was punctured or interfered; and that is correlated to the at least one code block in the code block group was not transmitted correctly.

12. The non-transitory storage medium according to claim 11, wherein the program codes further cause the communication device to perform the step of:

transmitting acknowledgement information in response to the retransmitted code block group to the radio access network device.

13. The non-transitory storage medium according to claim 11, wherein the at least one code block in the code block group that was not transmitted correctly was partially replaced or superimposed by data from another transmission flow that is different from a transmission flow that carries the transport block.

14. The non-transitory storage medium according to claim 11, wherein in restoring information carried in the received transport block, the program codes cause the communication device to perform the step of:

decoding the received transport block by excluding information in the code block group in the received transport block and including information in the retransmitted code block group, in instance that the indication information indicating the code block group of the transport block from the previous transmission is punctured or interfered.

15. The method according to claim 1, wherein the identification information comprises a group index of the code block group.

16. The method according to claim 1, wherein the indication information has two states, a first state of the two states indicates that the code block group from the previous transmission is punctured or interfered, and a second state of the two states indicates that the code block group from the previous transmission is not punctured or not interfered.

17. The terminal device according to claim 6, wherein the identification information comprises a group index of the code block group.

18. The terminal device according to claim 6, wherein the indication information has two states, a first state of the two states indicates that the code block group from the previous transmission is punctured or interfered, and a second state of the two states indicates that the code block group from the previous transmission is not punctured or not interfered.

19. The non-transitory storage medium according to claim 11, wherein the identification information comprises a group index of the code block group.

20. The non-transitory storage medium according to claim 11, wherein the indication information has two states, a first state of the two states indicates that the code block group from the previous transmission is punctured or interfered, and a second state of the two states indicates that the code block group from the previous transmission is not punctured or not interfered.

* * * * *

UNITED STATES PATENT AND TRADEMARK OFFICE
CERTIFICATE OF CORRECTION

PATENT NO. : 11,356,205 B2
APPLICATION NO. : 16/371131
DATED : June 7, 2022
INVENTOR(S) : Lei Guan et al.

It is certified that error appears in the above-identified patent and that said Letters Patent is hereby corrected as shown below:

In the Claims

Claim 1, Column 39, Line 43; delete "wherein".

Claim 1, Column 39, Line 45; delete "wherein" and insert --and--.

Signed and Sealed this
Nineteenth Day of July, 2022

Katherine Kelly Vidal
*Director of the United States Patent and Trademark Office*